US011353317B2

(12) United States Patent
Zweigle et al.

(10) Patent No.: US 11,353,317 B2
(45) Date of Patent: *Jun. 7, 2022

(54) SYSTEM AND METHOD OF DEFINING A PATH AND SCANNING AN ENVIRONMENT

(71) Applicant: FARO Technologies, Inc., Lake Mary, FL (US)

(72) Inventors: Oliver Zweigle, Stuttgart (DE); João Santos, Kornwestheim (DE); Aleksej Frank, Stuttgart (DE); Ahmad Ramadneh, Kornwestheim (DE); Muhammad Umair Tahir, Stuttgart (DE); Tobias Boehret, Aidlingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/938,166

(22) Filed: Jul. 24, 2020

(65) Prior Publication Data

US 2020/0355488 A1   Nov. 12, 2020

Related U.S. Application Data

(63) Continuation of application No. 16/802,887, filed on Feb. 27, 2020, which is a continuation of application No. 16/154,240, filed on Oct. 8, 2018, now Pat. No. 10,914,569.

(51) Int. Cl.
*G01B 11/00* (2006.01)
*G02B 26/10* (2006.01)
*G01S 7/4865* (2020.01)
*G01S 17/89* (2020.01)

(52) U.S. Cl.
CPC .......... *G01B 11/002* (2013.01); *G01S 7/4865* (2013.01); *G01S 17/89* (2013.01); *G02B 26/105* (2013.01)

(58) Field of Classification Search
CPC ................. G01B 11/002; G06T 7/521; G06T 2207/10028; B25J 5/007; B25J 9/06; B25J 9/162; G01C 21/16; G01C 21/32
USPC .................................................. 356/614–626
See application file for complete search history.

(56) References Cited

U.S. PATENT DOCUMENTS

| 6,614,538 B1 | 9/2003 | Basler et al. |
| 8,699,036 B2 | 4/2014 | Ditte et al. |
| 8,705,012 B2 * | 4/2014 | Greiner .................... G01C 3/00 356/3 |

(Continued)

FOREIGN PATENT DOCUMENTS

| EP | 3382337 A1 | 10/2018 |
| GB | 2551609 A | 12/2017 |
| WO | 2014068406 A2 | 5/2014 |

OTHER PUBLICATIONS

European Search Report for Application No. 19201247.4 dated Feb. 10, 2020; 8 pgs.

*Primary Examiner* — Isiaka O Akanbi
(74) *Attorney, Agent, or Firm* — Cantor Colburn LLP

(57) ABSTRACT

A system and method for measuring three-dimensional (3D) coordinate values of an environment is provided. The method including moving a scanning platform through the environment along a path. The position of the scanning platform is localized using the scanner. 3D coordinate values are with a 3D scanner that is coupled to the scanning platform.

15 Claims, 28 Drawing Sheets

(56) References Cited

U.S. PATENT DOCUMENTS

| | | |
|---|---|---|
| 9,632,504 B1 | 4/2017 | Watts |
| 10,408,606 B1 | 9/2019 | Raab et al. |
| 10,739,458 B2 | 8/2020 | Zweigle |
| 2006/0193521 A1* | 8/2006 | England ................. G01S 17/42 382/190 |
| 2007/0067104 A1 | 3/2007 | Mays |
| 2012/0035788 A1* | 2/2012 | Trepagnier ............ B60W 10/20 701/3 |
| 2013/0070250 A1 | 3/2013 | Ditte et al. |
| 2015/0160342 A1 | 6/2015 | Zweigle et al. |
| 2015/0160343 A1 | 6/2015 | Zweigle et al. |
| 2015/0160347 A1 | 6/2015 | Zweigle et al. |
| 2015/0160348 A1 | 6/2015 | Zweigle |
| 2015/0269792 A1 | 9/2015 | Wood |
| 2016/0260054 A1 | 9/2016 | High et al. |
| 2016/0291160 A1 | 10/2016 | Zweigle et al. |
| 2016/0327383 A1 | 11/2016 | Becker et al. |
| 2017/0054965 A1* | 2/2017 | Raab ......................... G06T 7/70 |
| 2017/0144682 A1 | 5/2017 | Kamei et al. |
| 2017/0184711 A1 | 6/2017 | Becker et al. |
| 2019/0340433 A1 | 11/2019 | Frank et al. |
| 2019/0346271 A1 | 11/2019 | Zhang et al. |
| 2020/0109937 A1 | 4/2020 | Zweigle |
| 2020/0109943 A1 | 4/2020 | Buback |
| 2020/0191555 A1 | 6/2020 | Zweigle |

* cited by examiner

SYSTEM AND METHOD OF DEFINING A PATH AND SCANNING AN ENVIRONMENT

CROSS-REFERENCE TO RELATED APPLICATIONS

The Present application is a continuation application with U.S. patent application Ser. No. 16/802,887 filed Feb. 27, 2020, which is a continuation of U.S. patent application Ser. No. 16/154,240 filed Oct. 8, 2018, the contents of both of which is incorporated by reference herein in their entirety.

BACKGROUND

The present application is directed to a system that optically scans an environment, such as a building, and in particular to a mobile scanning system that generates three-dimensional scans environment.

The automated three-dimensional (3D) scanning of an environment is desirable as a number of scans may be performed in order to obtain a complete scan of the area. 3D coordinate scanners include time-of-flight (TOF) coordinate measurement devices. A TOF laser scanner is a scanner in which the distance to a target point is determined based on the speed of light in air between the scanner and a target point. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

It should be appreciated that where an object (e.g. a wall, a column, or a desk) blocks the beam of light, that object will be measured but any objects or surfaces on the opposite side will not be scanned since they are in the shadow of the object relative to the scanner. Therefore, to obtain a more complete scan of the environment, the TOF scanner is moved to different locations and separate scans are performed. Subsequent to the performing of the scans, the 3D coordinate data (i.e. the point cloud) from each of the individual scans are registered to each other and combined to form a 3D image or model of the environment.

Existing measurement systems typically are mounted to a movable structure, such as a cart, and moved through the building to generate a digital representation of the building. These systems tend to be more complex and require specialized personnel to perform the scan. Further, the scanning equipment including the movable structure may be bulky, which could further delay the scanning process in time sensitive situations, such as a crime or accident scene investigation.

Scanners coupled to autonomous or semi-autonomous mobile platforms can assist in reducing the effort of moving the scanner. However, with these systems, the autonomous/semi-autonomous mobile platform is moved around the environment before the scans are performed. The movement of the mobile platform allows for the generating of a 2D map of the environment and the setting of a path for the mobile platform to follow. This planning stage is time consuming and needs to be performed carefully to obtain the desired results.

Accordingly, while existing scanners are suitable for their intended purposes, what is needed is a system for having certain features of embodiments of the present invention.

BRIEF DESCRIPTION

According to one aspect of the invention, a system for measuring three-dimensional (3D) coordinate values of an environment is provided. The system includes a mobile base unit and a scanner coupled to the base unit. The scanner including a light source, an image sensor and a controller, the controller being configured to determine a distance value to one or more object points in the environment based on emitting a beam of light with the light source and receiving the beam of light with the image sensor. A 3D scanner is coupled to the base unit, the 3D scanner operable to selectively measure 3D coordinates of surfaces in the environment. One or more processors are operably coupled to the base unit, the scanner and the 3D scanner, the one or more processors being responsive to nontransitory executable instructions for performing a method comprising: moving the mobile base unit through the environment along a path; localizing the mobile base unit within the environment based at least in part on the scanner emitting and receiving the beam of light while the mobile base unit is moved along the path; causing the 3D scanner to measure 3D coordinate values of the environment; and storing the 3D coordinate values in memory.

According to another aspect of the invention, a method for measuring three-dimensional (3D) coordinate values of an environment is provided. The method including moving a scanning platform through the environment along a path, the scanning platform having a scanner and a 3D scanner, the scanner having a light source and an image sensor, the 3D scanner being operable to measure 3D coordinates of surfaces in the environment. The scanning platform is localized as the scanning platform is moved along the path, the localizing being based on the scanner emitting a beam of light and receiving with the image sensor a reflection of the beam of light. 3D coordinate values of the environment are measured with the 3D scanner.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments of the present disclosure relate to a mobile scanning platform that may have a path defined without previously moving the mobile platform. Embodiments of the present disclosure provide for a mobile scanning platform that may be used to scan an environment in an autonomous or semi-autonomous manner.

Figure 1:
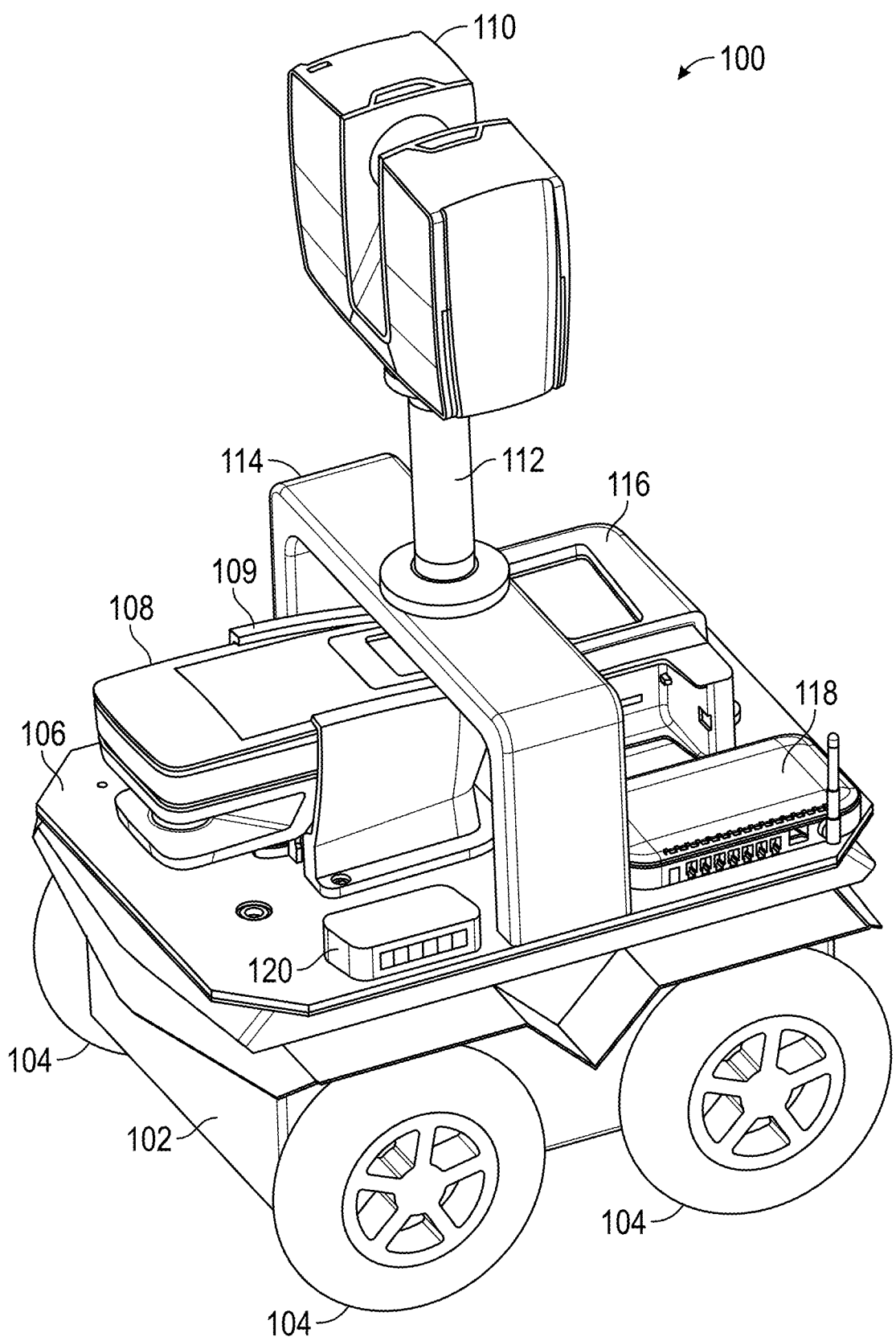
FIG. 1 is a perspective view of a mobile scanning platform having a time-of-flight scanner in accordance with an embodiment.
Figure 2:
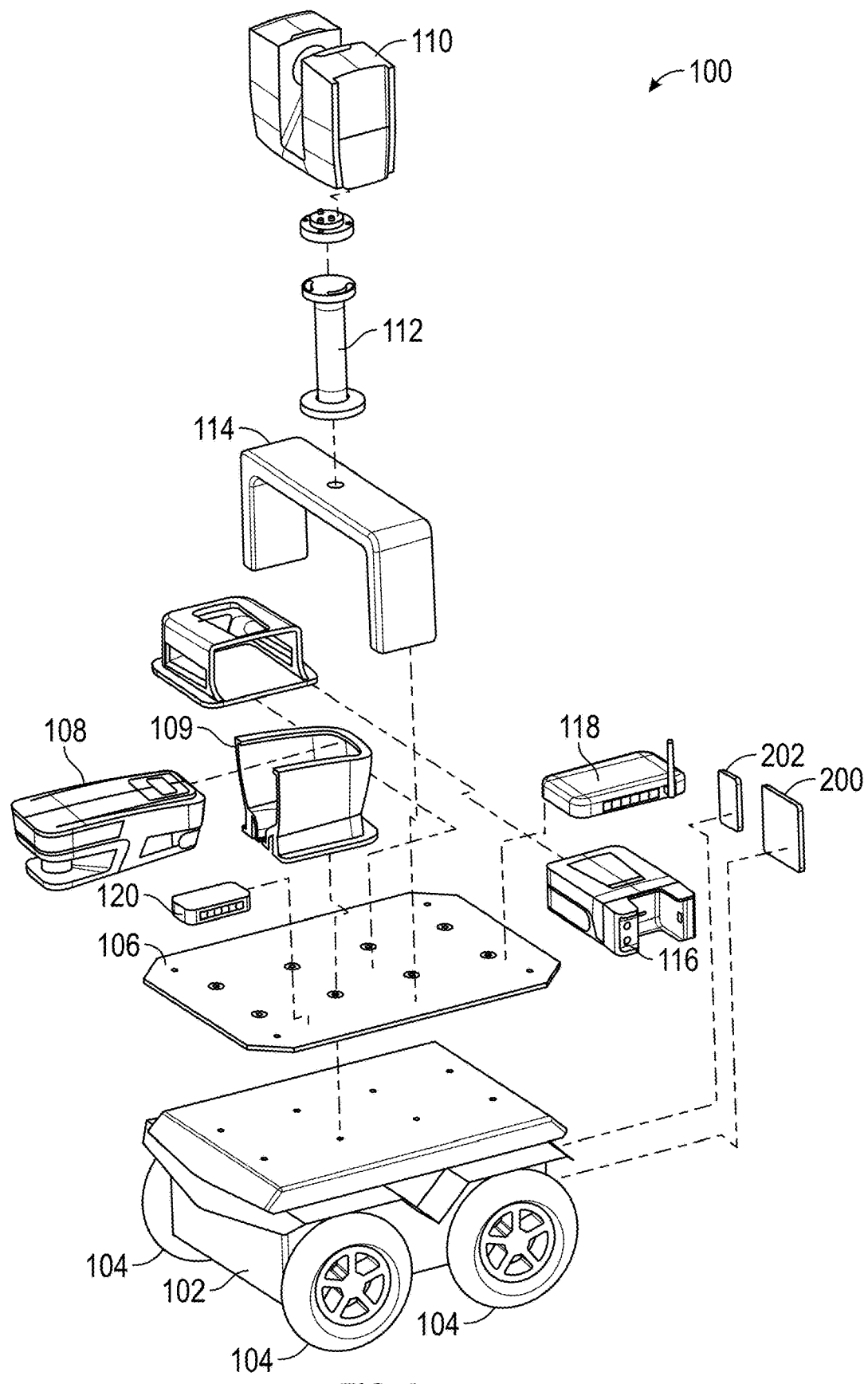
FIG. 2 is an unassembled view of the mobile scanning platform of FIG. 1.
Figure 5:
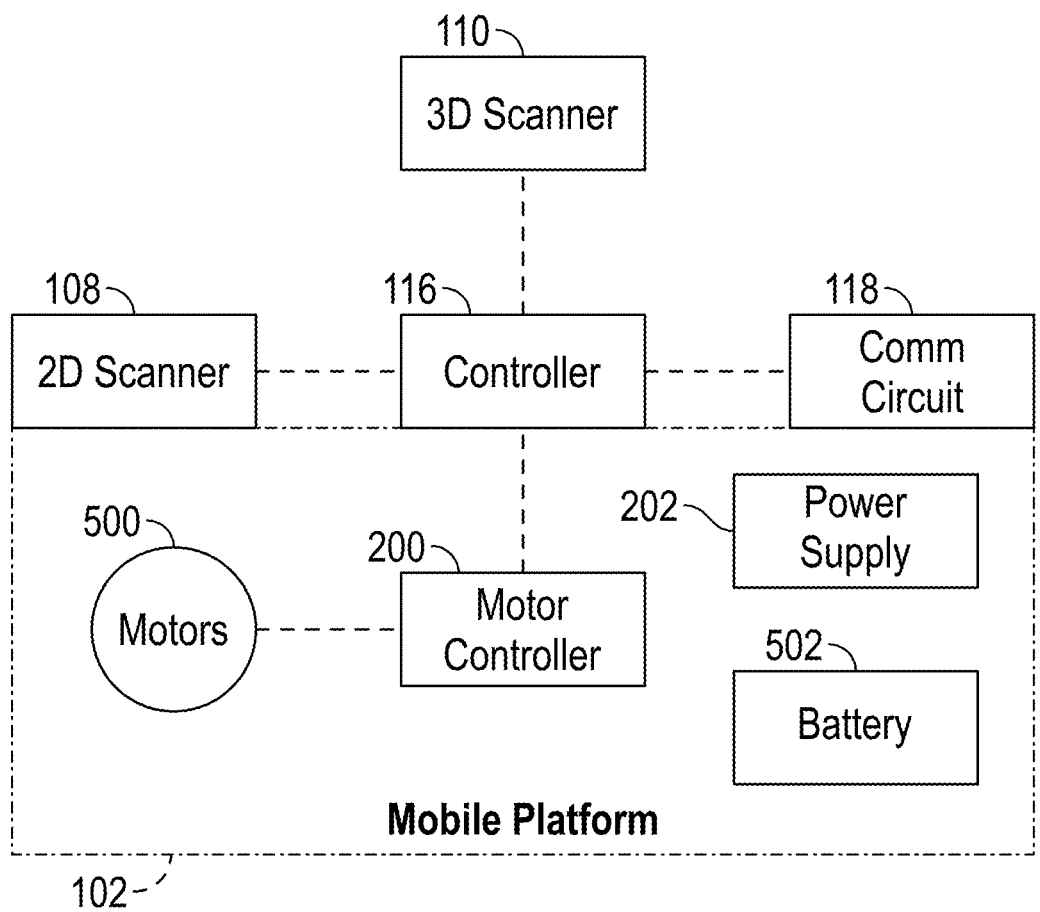
FIG. 5 is a block diagram of the system of FIG. 1.
Figure 6:
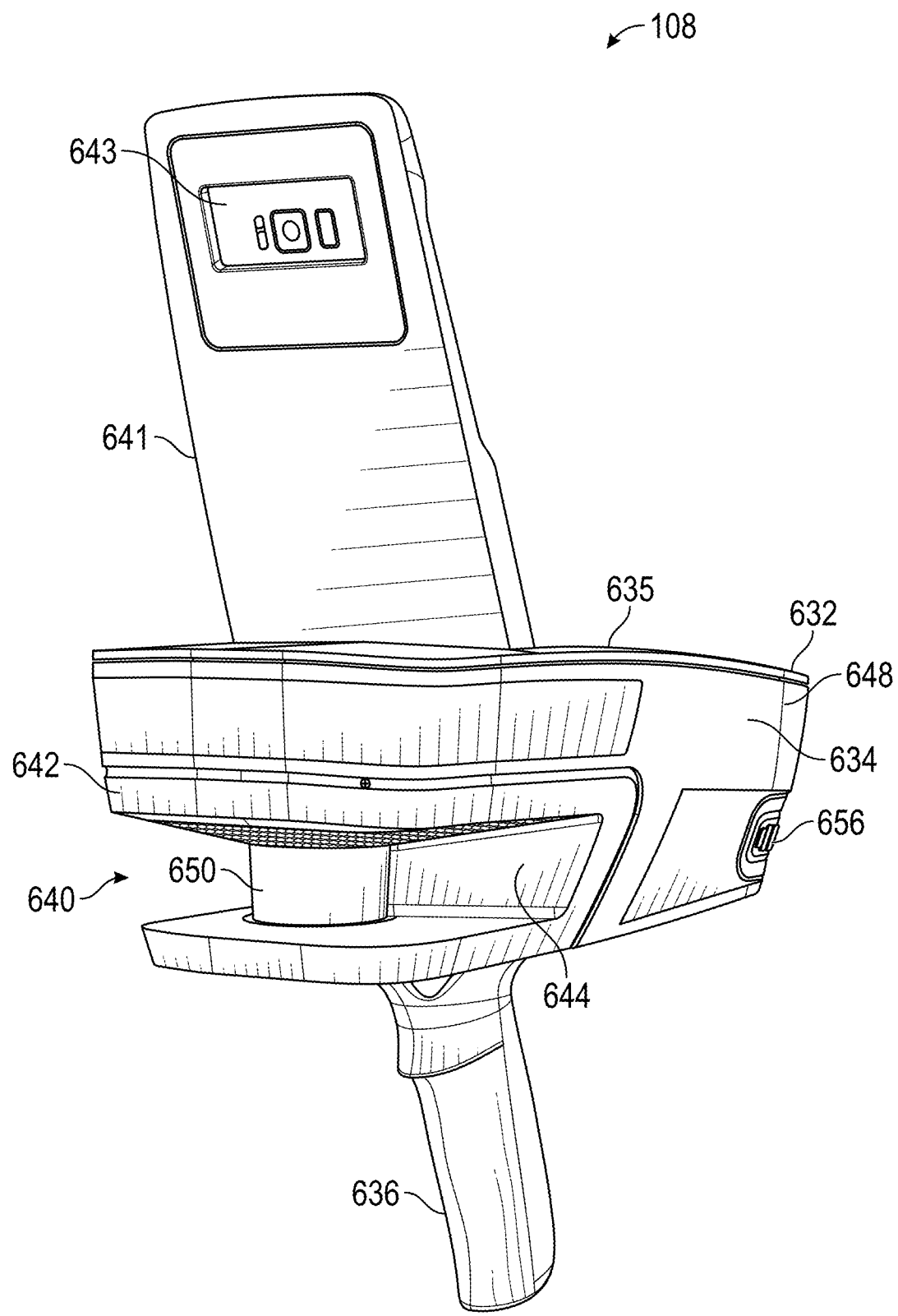
FIGS. 6-8 are perspective views of a two-dimensional (2D) scanning and mapping system for use with the mobile scanning platform of FIG. 1, in accordance with an embodiment.
Figure 7:
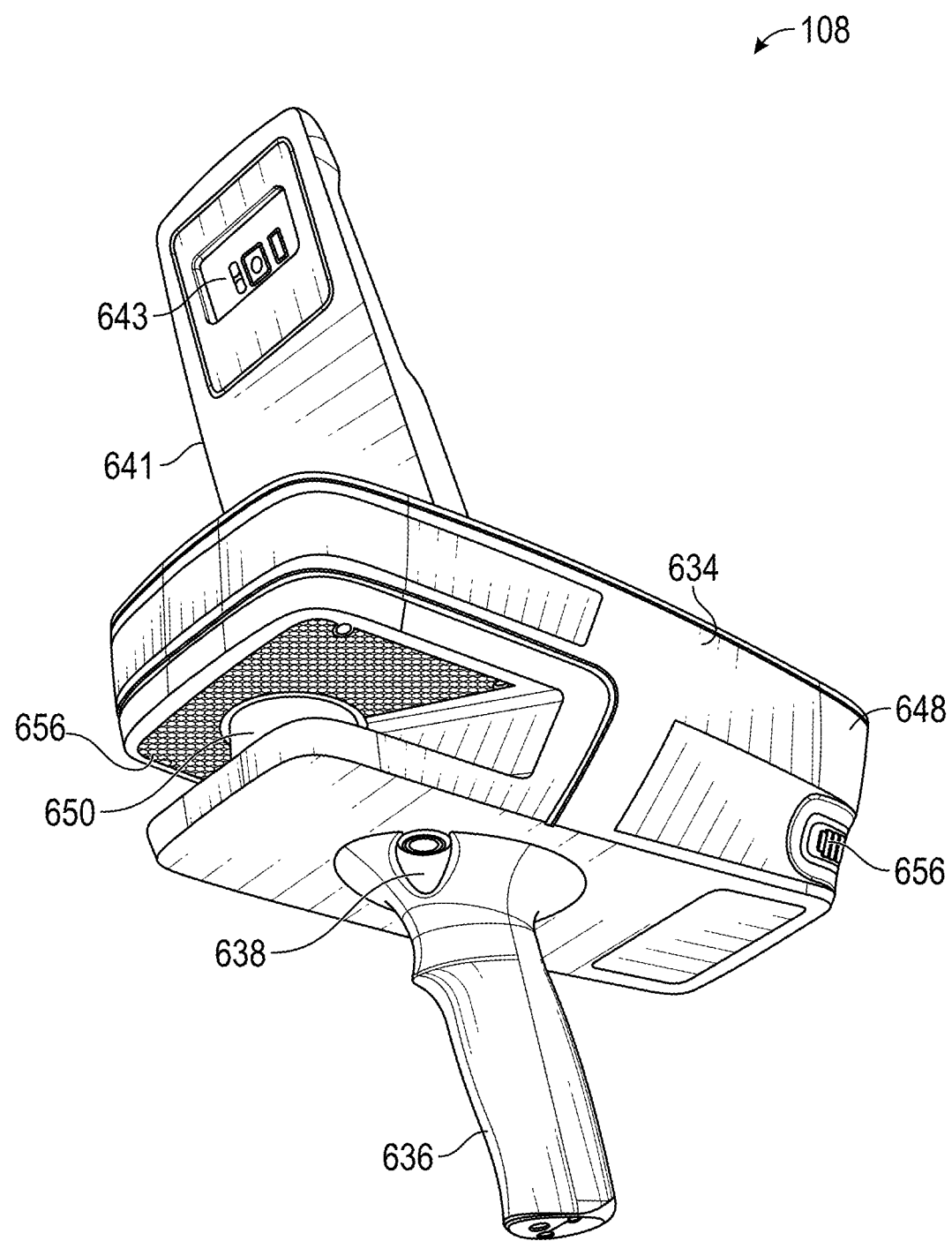
Figure 8:
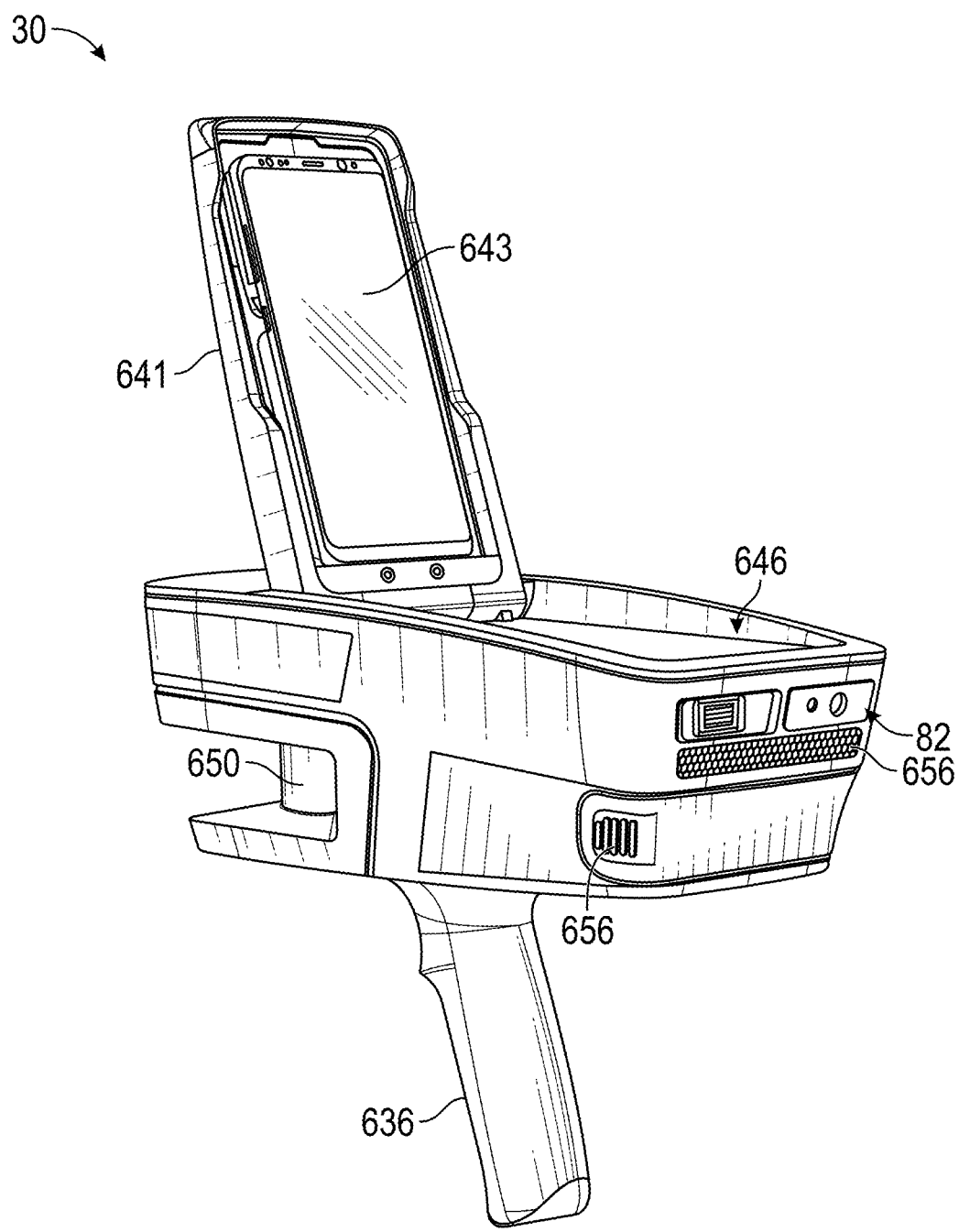
Figure 9:
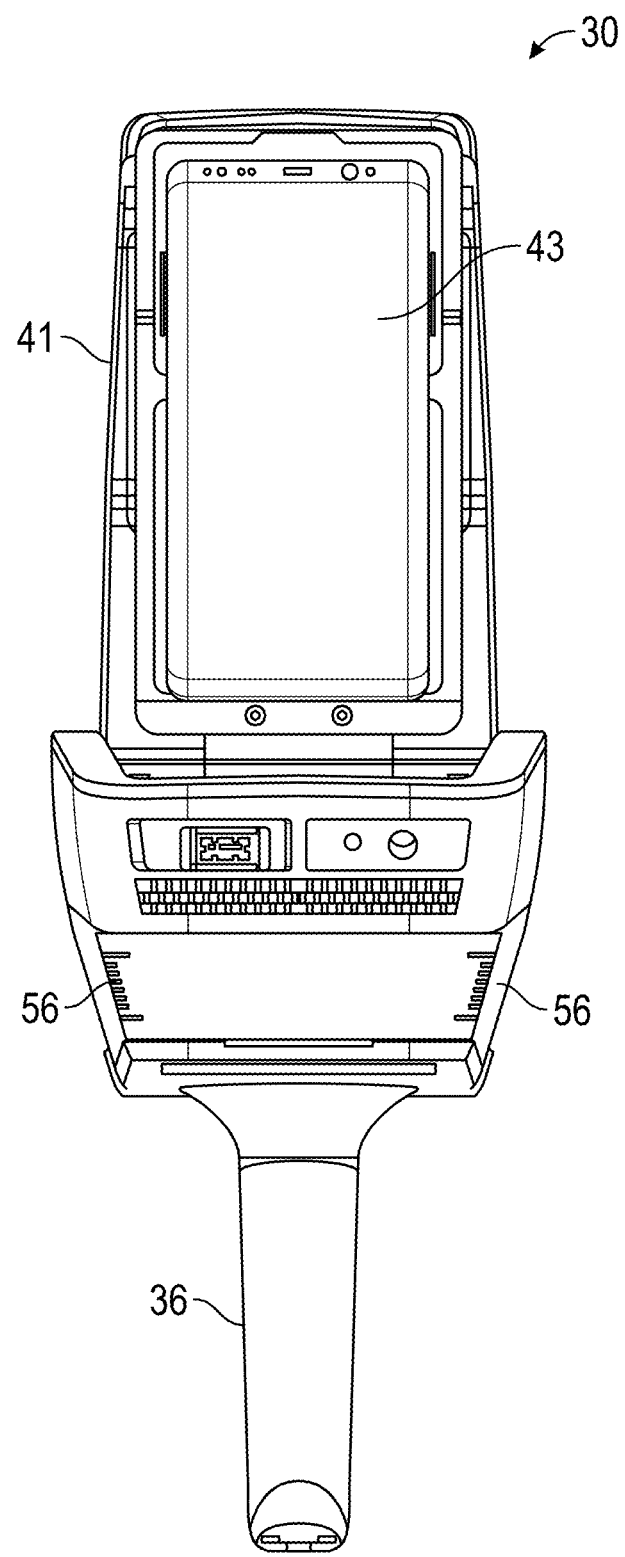
FIG. 9 is a first end view of the system of FIG. 6.

Referring now to FIG. 1 and FIG. 2, an embodiment is shown of a mobile scanning platform 100. The mobile scanning platform 100 includes a base unit 102 having a plurality of wheels 104. The wheels 104 are rotated by motors 500 (FIG. 5). In an embodiment, an adapter plate 106 is coupled to the base unit 102 to allow components and modules to be coupled to the base unit 102. The mobile scanning platform 100 further includes a 2D scanner 108 and a 3D scanner 110. In the illustrated embodiment, each scanner 108, 110 is removably coupled to the adapter plate 106. The 2D scanner 108 may be the scanner illustrated and described in reference to FIGS. 6-15. As will be described in more detail herein, the 2D scanner 108 is removable from the adapter plate 106 and is used to generate a map of the environment, plan a path for the mobile scanning platform to follow, and define 3D scanning locations. In the illustrated embodiment, the 2D scanner 108 is slidably coupled to a bracket 109 that couples the 2D scanner 108 to the adapter plate 106.

Figure 24:
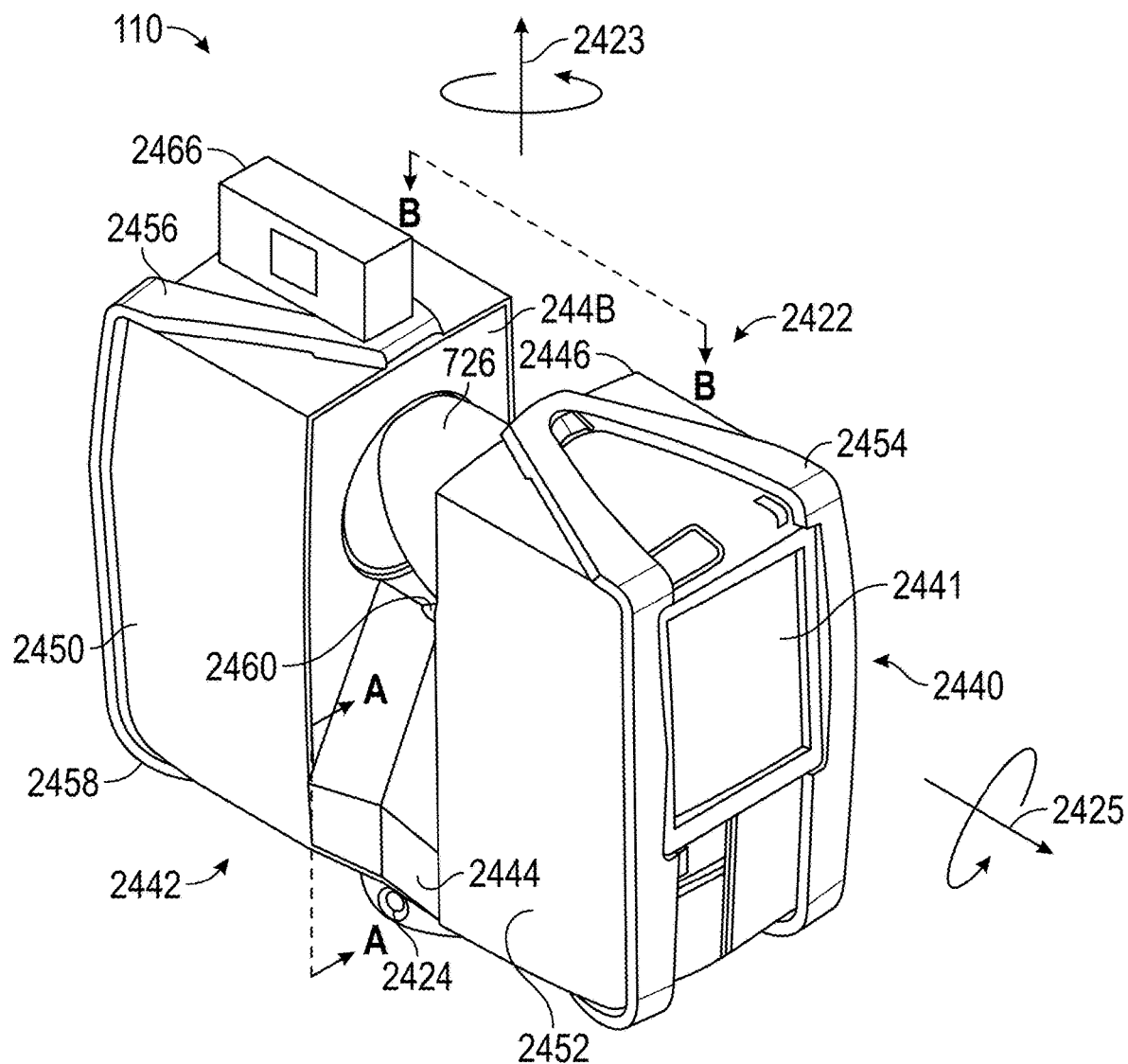
FIGS. 24-26 are views of a time-of-flight laser scanner for use with the mobile scanning platform of FIG. 1 in accordance with an embodiment.
Figure 25:
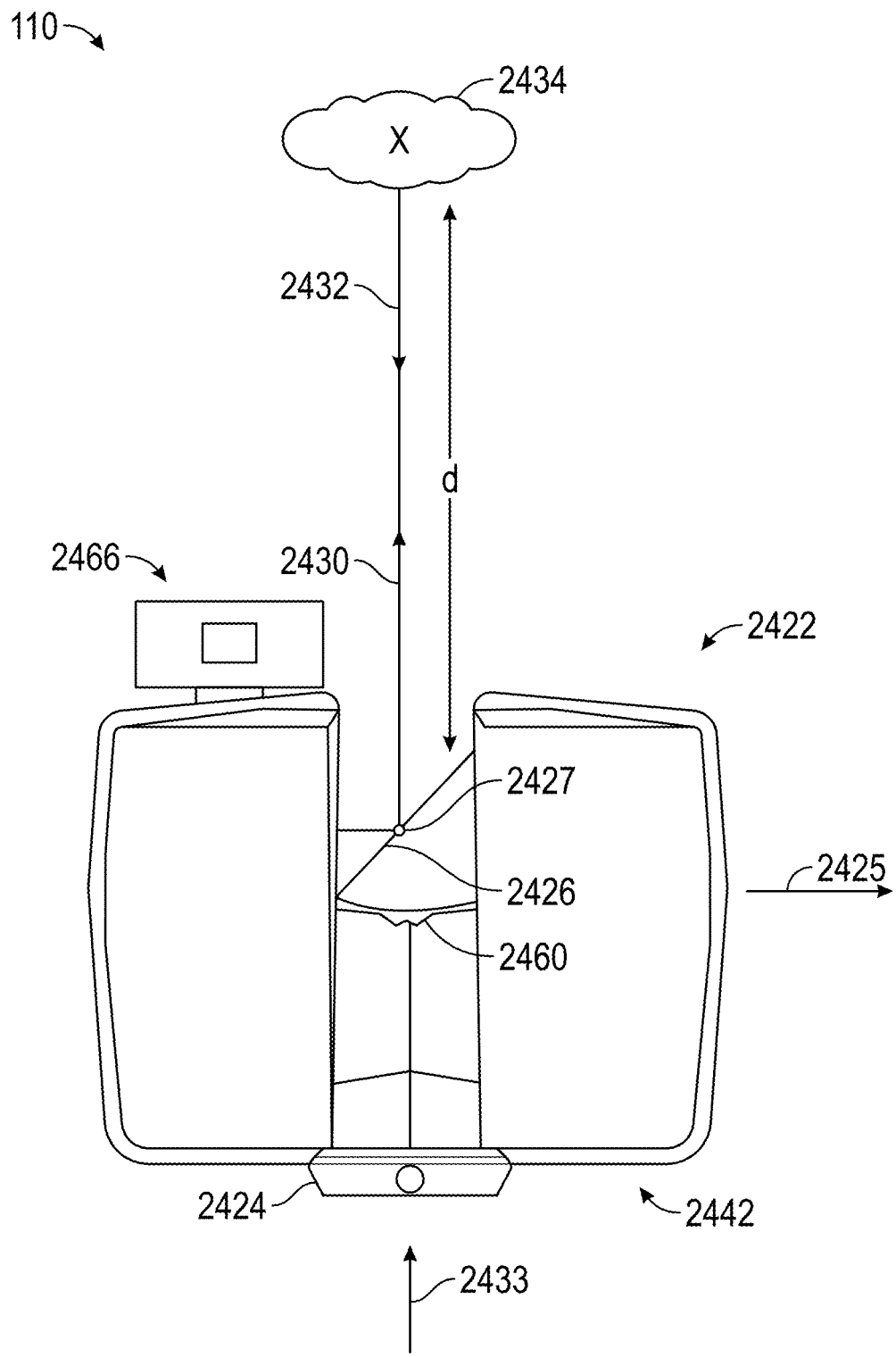
Figure 26:
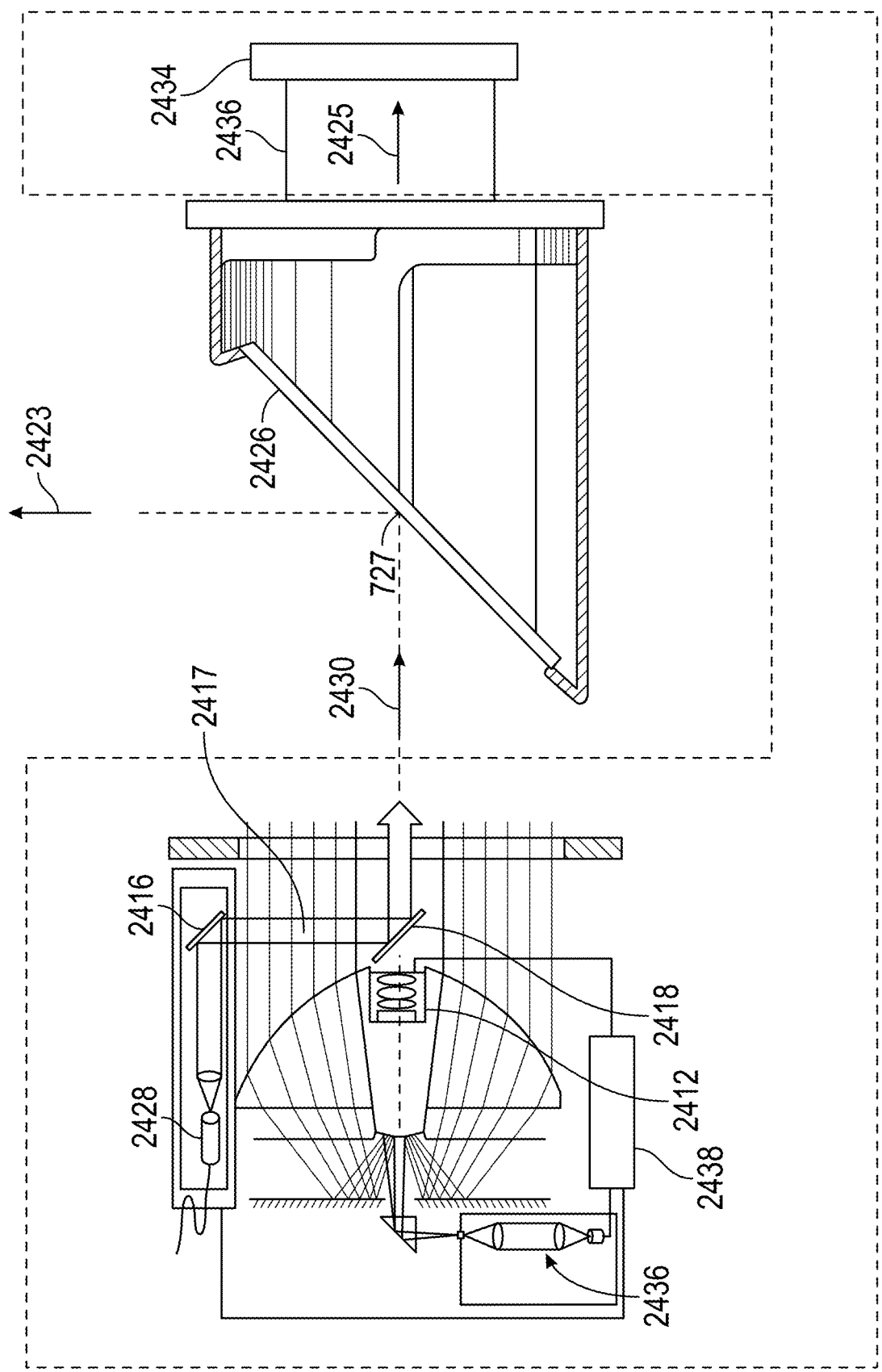

In an embodiment, the 3D scanner 110 is a time-of-flight (TOF) laser scanner such as that shown and described in reference to FIGS. 24-26. The TOF scanner 110 may be that described in commonly owned U.S. Pat. No. 8,705,012, which is incorporated by reference herein. In an embodiment, the 3D scanner 110 mounted on a pedestal 112 that elevates the 3D scanner 110 above (e.g. further from the floor than) the other components in the mobile scanning platform 100 so that the emission and receipt of the light beam is not interfered with. In the illustrated embodiment, the pedestal 112 is coupled to the adapter plate 106 by a u-shaped frame 114.

Figure 28:
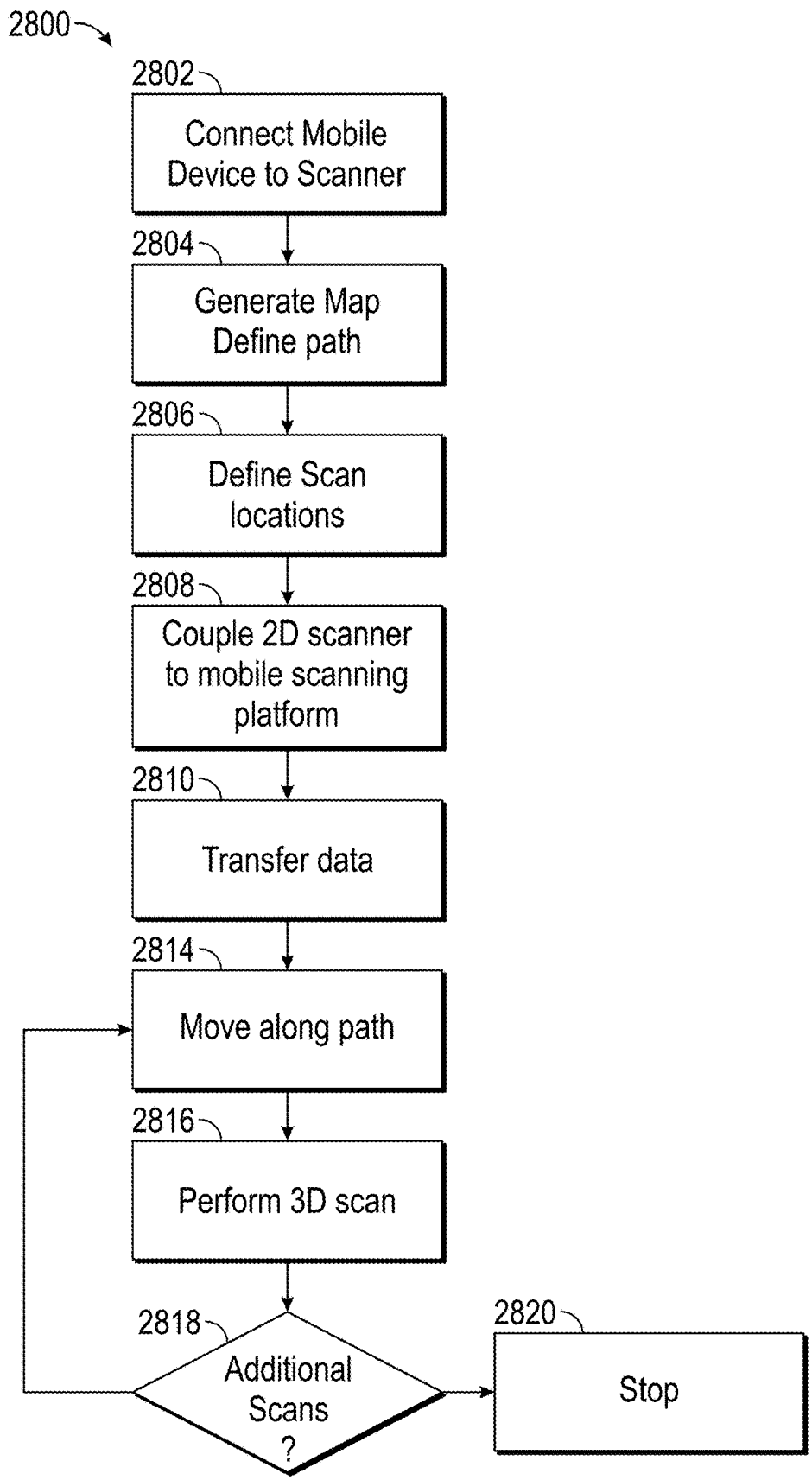
FIG. 28 is a flow diagram of a method of scanning an environment using the mobile scanning platform of FIG. 1 or FIG. 3.
Figure 29:
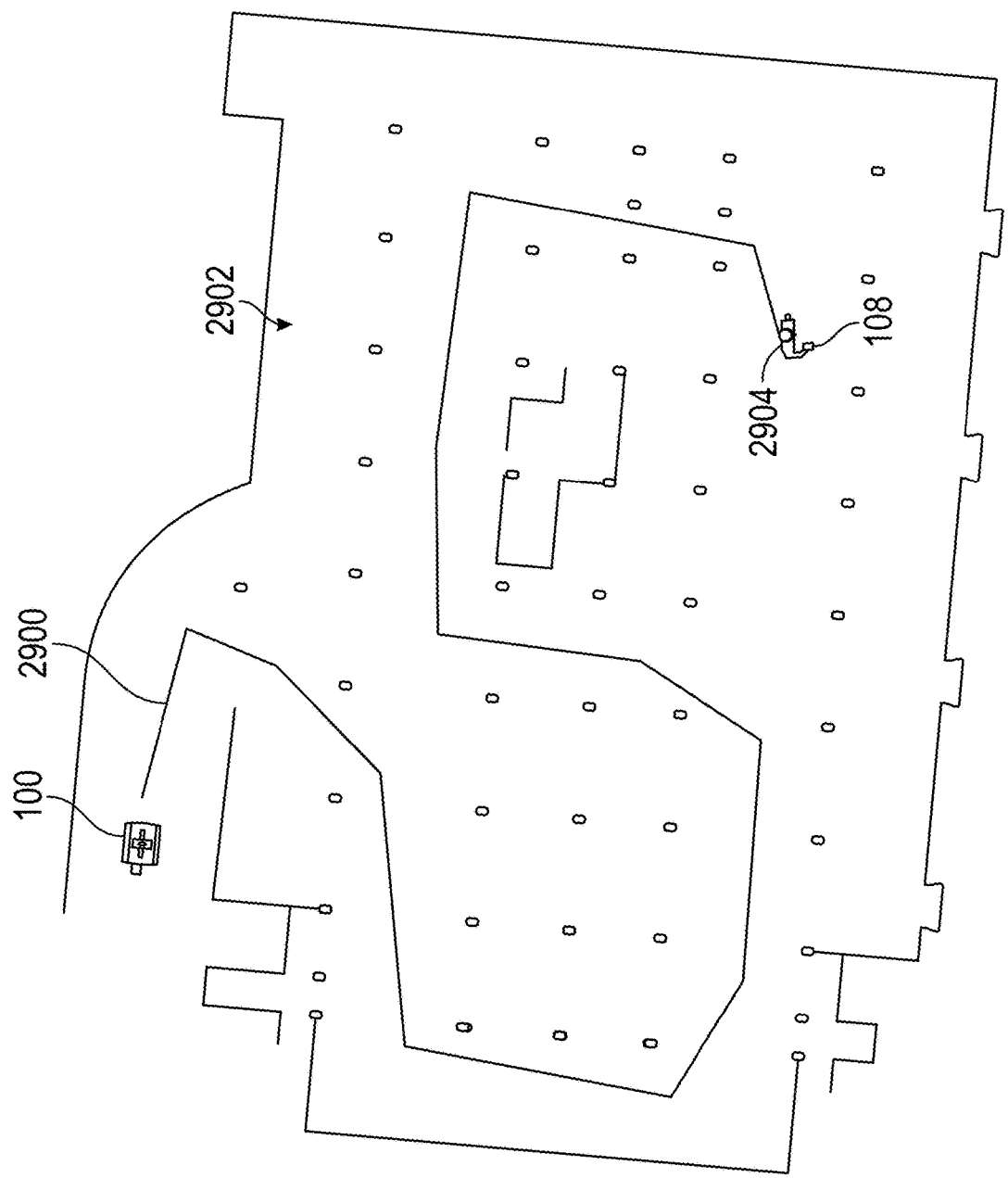
FIGS. 29-31 are schematic illustrations of the method of scanning an environment of FIG. 24.
Figure 30:
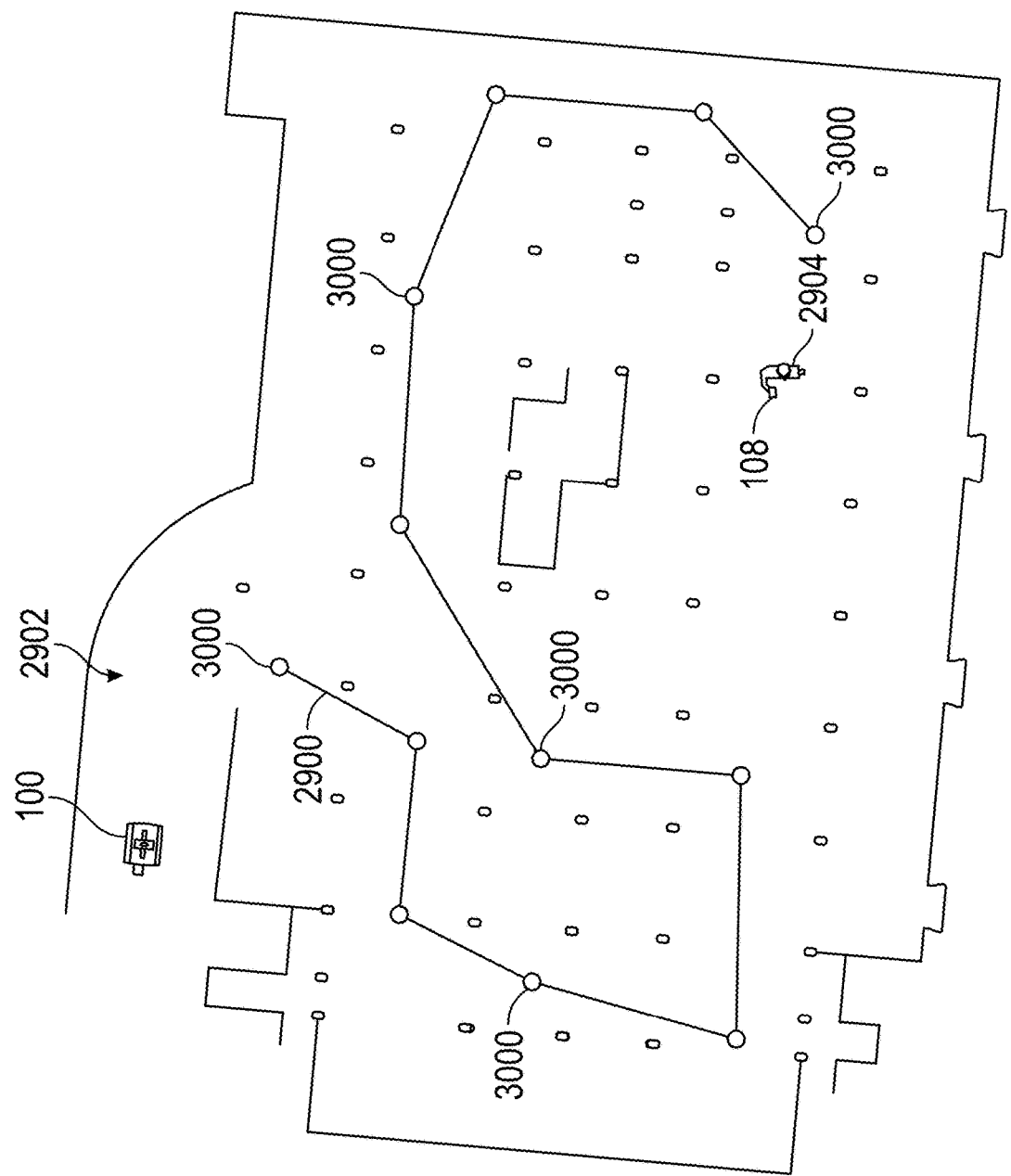
Figure 31:
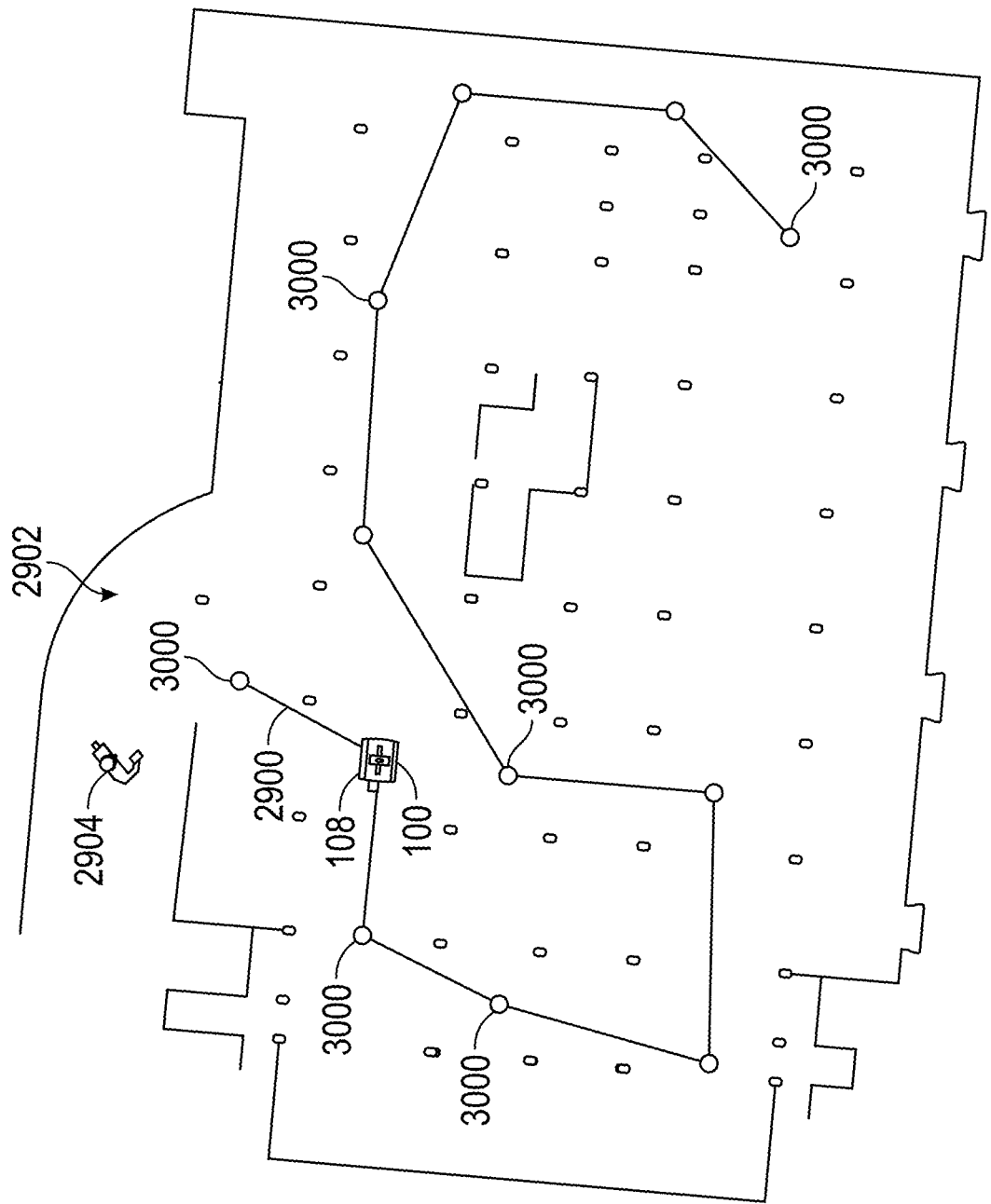

In an embodiment, the mobile scanning platform 100 further includes a controller 116. The controller 116 is a computing device having one or more processors and memory. The one or more processors are responsive to non-transitory executable computer instructions for performing operational methods, such as that shown and described with respect to FIG. 28 for example. The processors may be microprocessors, field programmable gate arrays (FPGAs), digital signal processors (DSPs), and generally any device capable of performing computing functions. The one or more processors have access to memory for storing information.

Coupled for communication to the controller 116 is a communications circuit 118 and a input/output hub 120. In the illustrated embodiment, the communications circuit 118 is configured to transmit and receive data via a wireless radio-frequency communications medium, such as WiFi or Bluetooth for example. In an embodiment, the 2D scanner 108 communicates with the controller 116 via the communications circuit 118

In an embodiment, the mobile scanning platform 100 further includes a motor controller 200 that is operably coupled to the control the motors 500 (FIG. 5). In an embodiment, the motor controller 200 is mounted to an external surface of the base unit 102. In another embodiment, the motor controller 200 is arranged internally within the base unit 102. The mobile scanning platform 100 further includes a power supply 202 that controls the flow of electrical power from a power source, such as batteries 502 for example. The batteries 502 may be disposed within the interior of the base unit 102. In an embodiment, the base unit 102 includes a port (not shown) for coupling the power supply to an external power source for recharging the batteries 502. In another embodiment, the batteries 502 are removable or replaceable.

Figure 3:
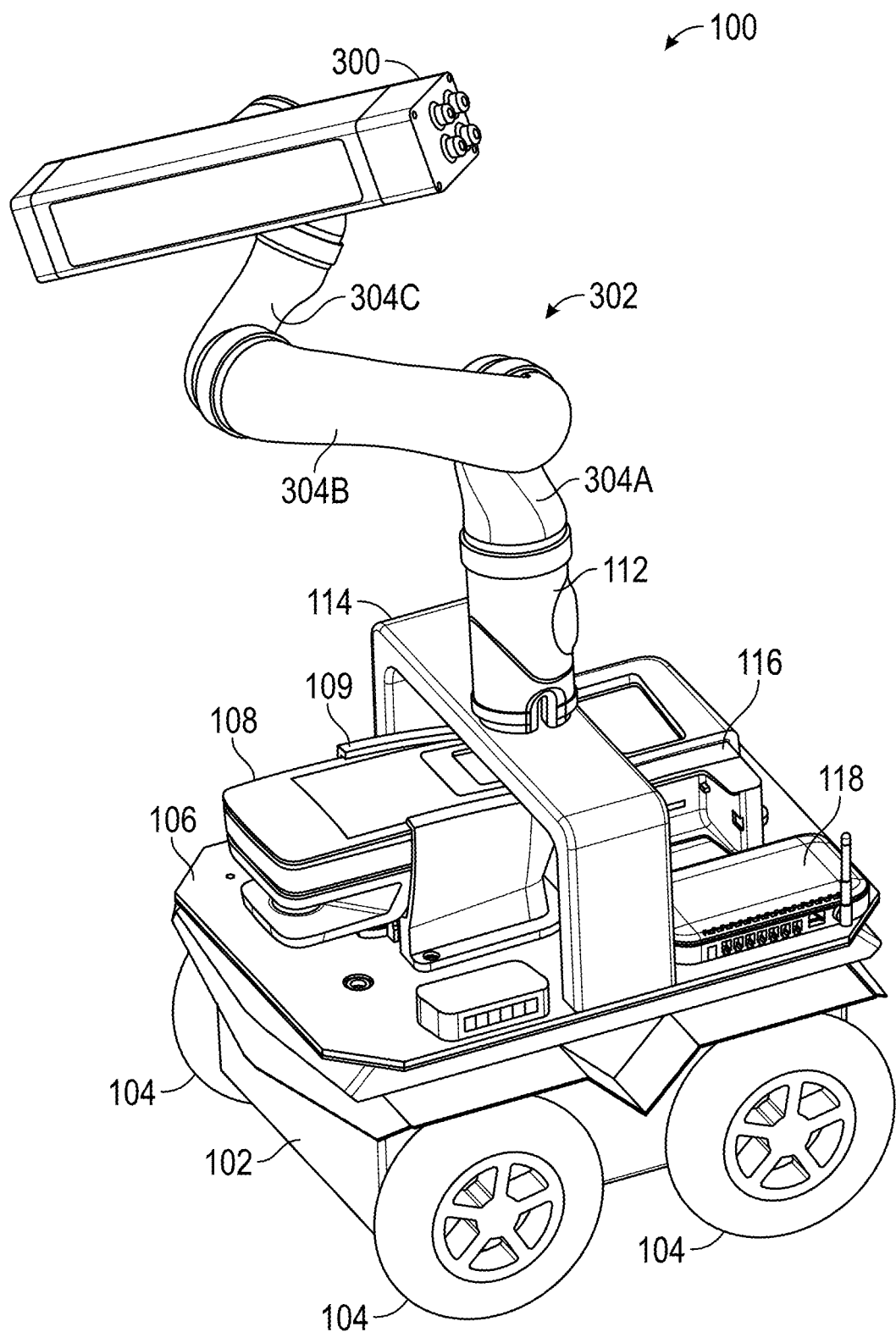
FIG. 3 is a perspective view of a mobile scanning platform of FIG. 1 having a triangulation scanner in accordance with an embodiment.
Figure 4:
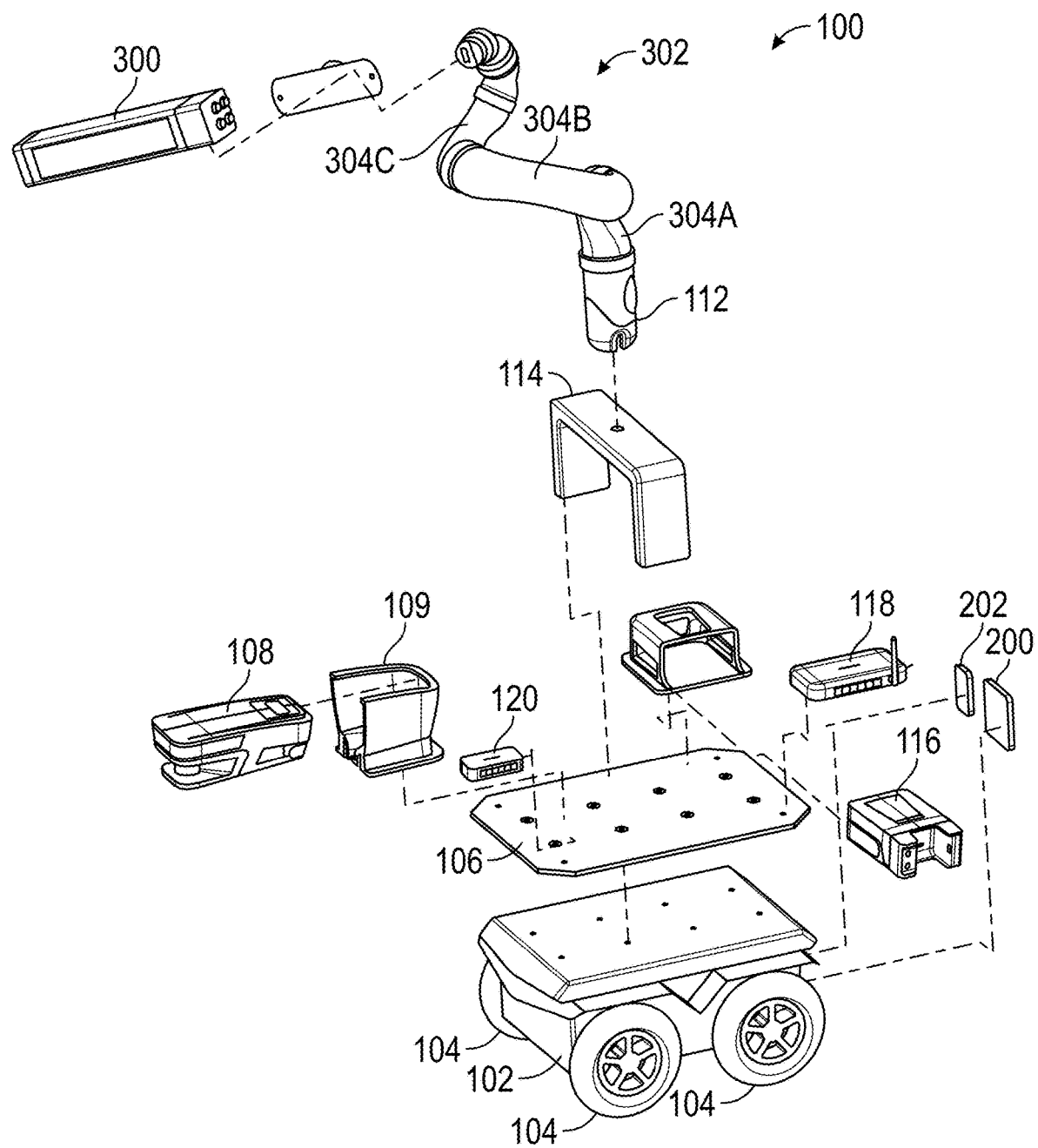
FIG. 4 is an unassembled view of the mobile scanning platform of FIG. 3.

Referring now to FIG. 3 and FIG. 4, another embodiment of the mobile scanning platform 100 is shown. In this embodiment, the 3D scanner 300 is a triangulation or area scanner. The 3D scanner 300 may the same as the scanner shown and described with respect to FIGS. 27A-27D for example. In an embodiment, the 3D scanner 300 is the same as that described in commonly owned United States United States Patent Application 2017/0054965 or U.S. patent application Ser. No. 15/784,437, the contents of both of which are incorporated by reference herein.

Unlike the TOF scanner 110, which scans in a volume about the mobile scanner platform 100, the triangulation scanner 300 scans in an area. To accommodate this, and provide flexibility on area to be scanned, the triangulation scanner 300 is mounted to the pedestal 112 by an articulated arm 302. The articulated arm 302 is comprised of a plurality of arm segments 304A, 304B, 304C, 304D that are coupled to joints 306A, 306B, 306C, 306D that allow the arm segments to pivot and swivel allowing the area scanned by the triangulation scanner 300 to be changed or moved. It should be appreciated that the articulated arm 302 may have more or fewer arm segments. The articulated arm 302 further includes actuators (not shown), such as motors for example, that rotate the arm segments in response to a signal from the controller 116.

Referring now to FIGS. 6-10, an embodiment of a 2D scanner 108 is shown having a housing 632 that includes a body portion 634 and a removable handle portion 636. It should be appreciated that while the embodiment of FIGS. 6-10 illustrate the 2D scanner 108 with the handle 636 attached, the handle 636 may be removed before the 2D scanner 108 is coupled to the base unit 102. In an embodiment, the handle 636 may include an actuator 638 that allows the operator to interact with the scanner 108. In the exemplary embodiment, the body 634 includes a generally rectangular center portion 635 with a slot 640 formed in an end 642. The slot 640 is at least partially defined by a pair walls 644 that are angled towards a second end 648. As will be discussed in more detail herein, a portion of a 2D laser scanner 650 is arranged between the walls 644. The walls 644 are angled to allow the 2D laser scanner 650 to operate by emitting a light over a large angular area without interference from the walls 644. As will be discussed in more detail herein, the end 642 may further include a three-dimensional camera or RGBD camera.

Figure 10:
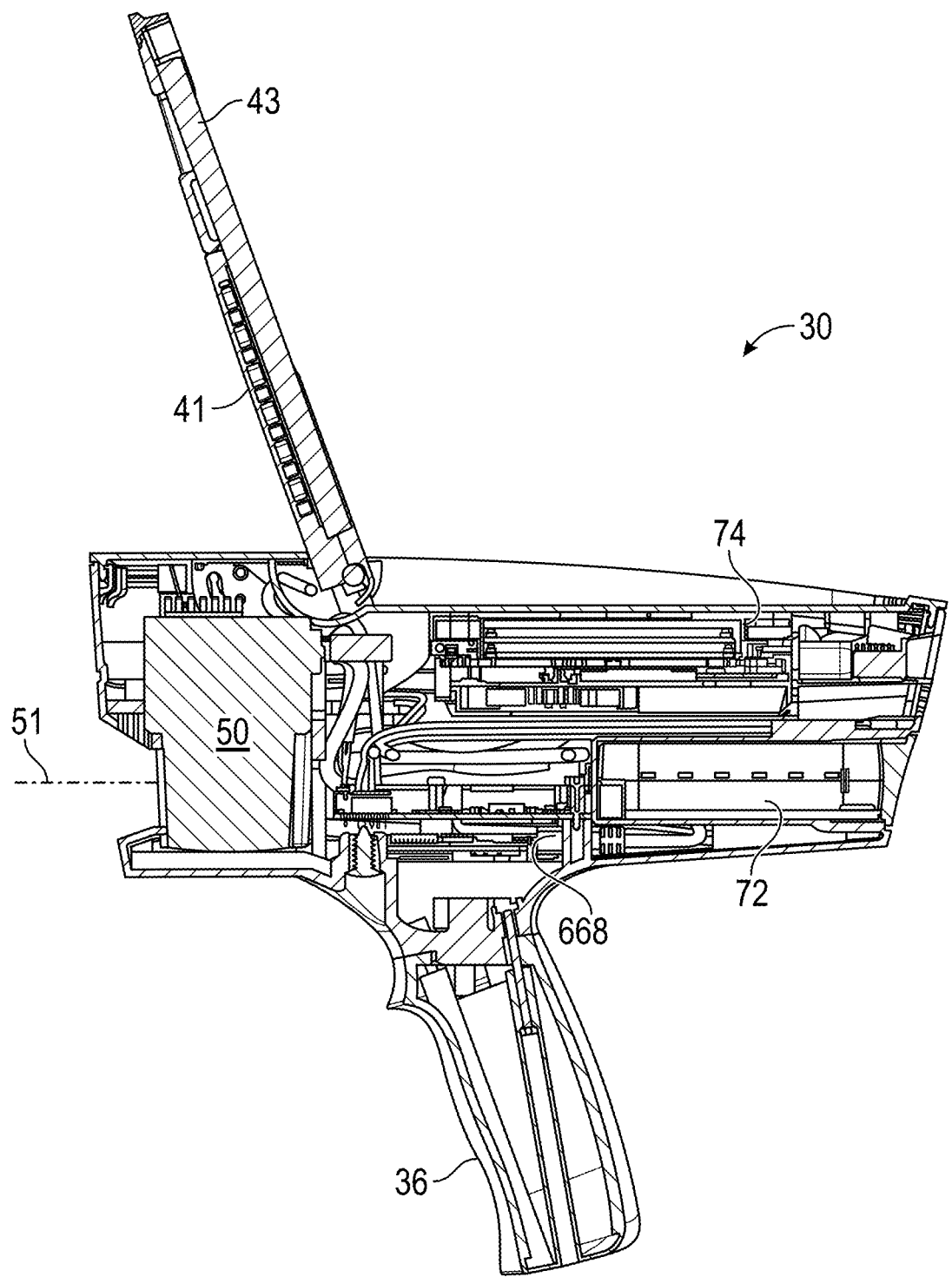
FIG. 10 is a side sectional view of the system of FIG. 6.
Figure 11:
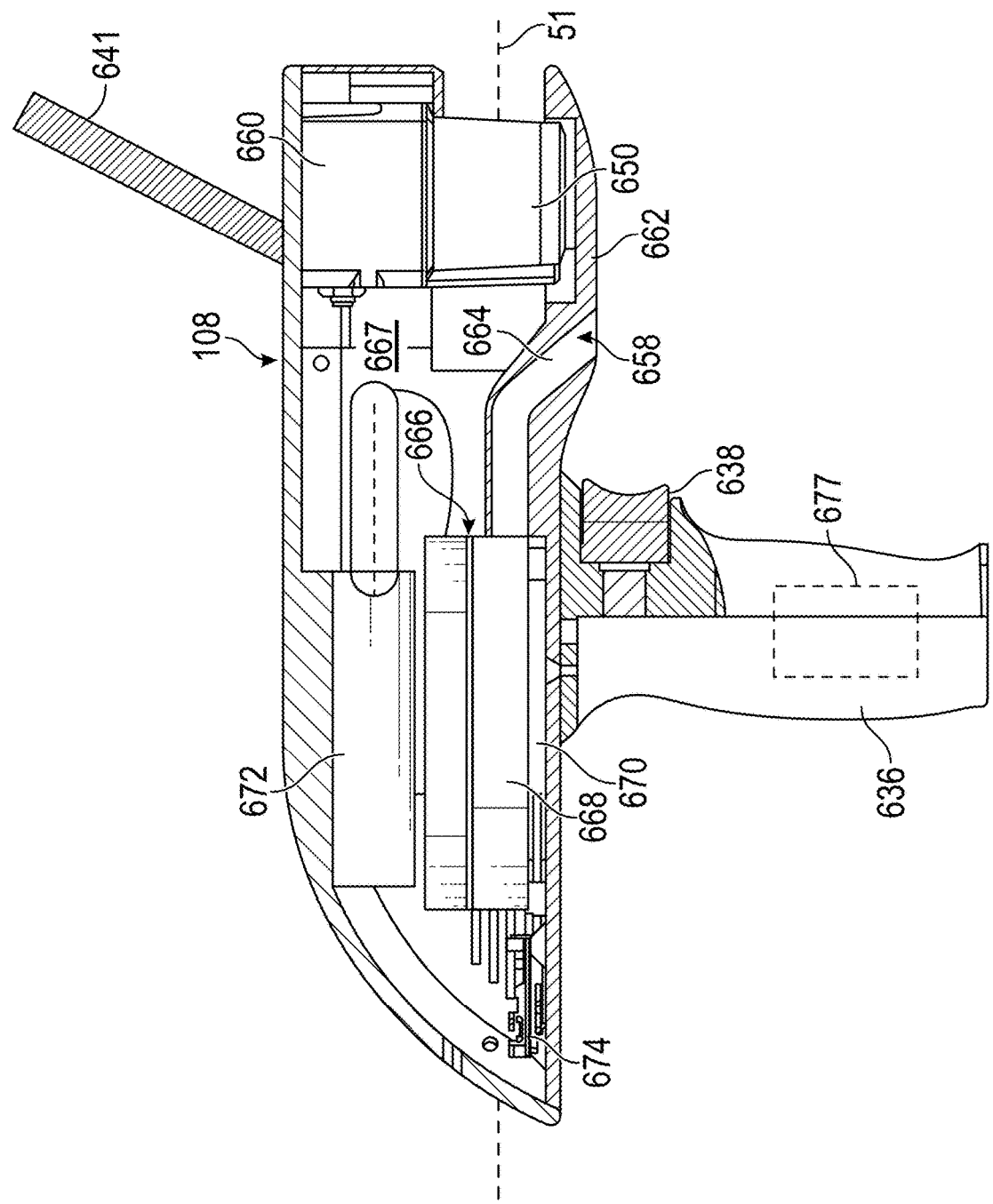
FIG. 11 is a side sectional view of the system of a scanning and mapping system in accordance with another embodiment.
Figure 12:
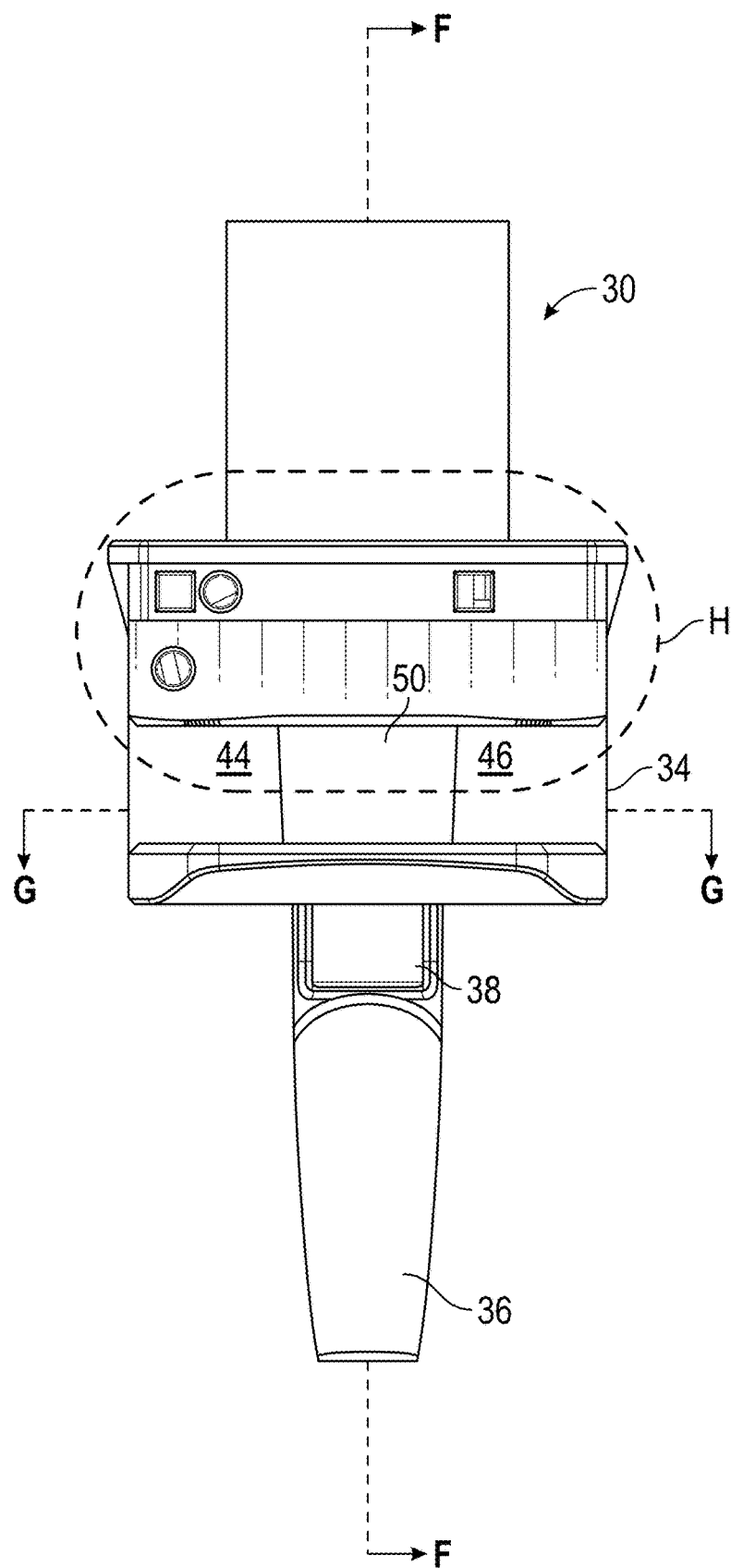
FIG. 12 is a first end view of the system of FIG. 11.
Figure 13:
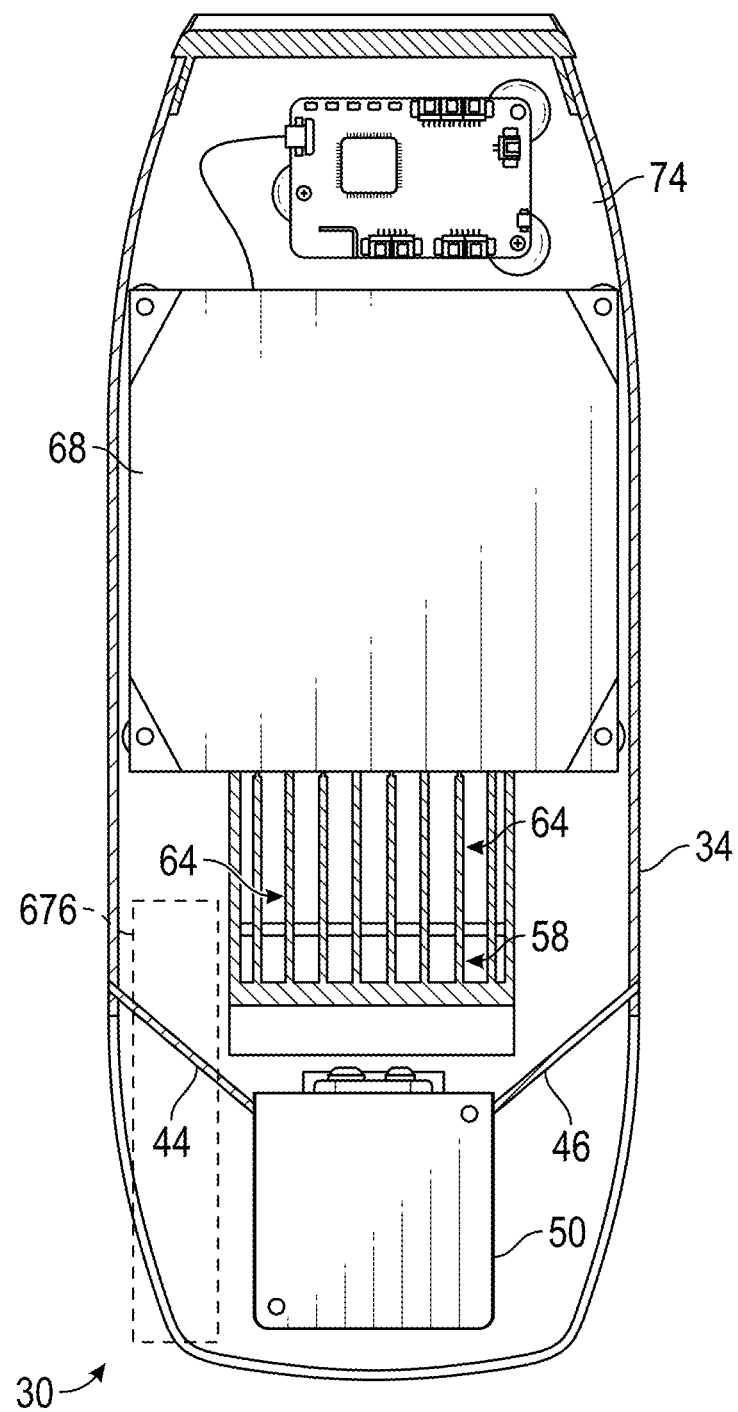
FIG. 13 is a top sectional view of the system of FIG. 11.
Figure 14:
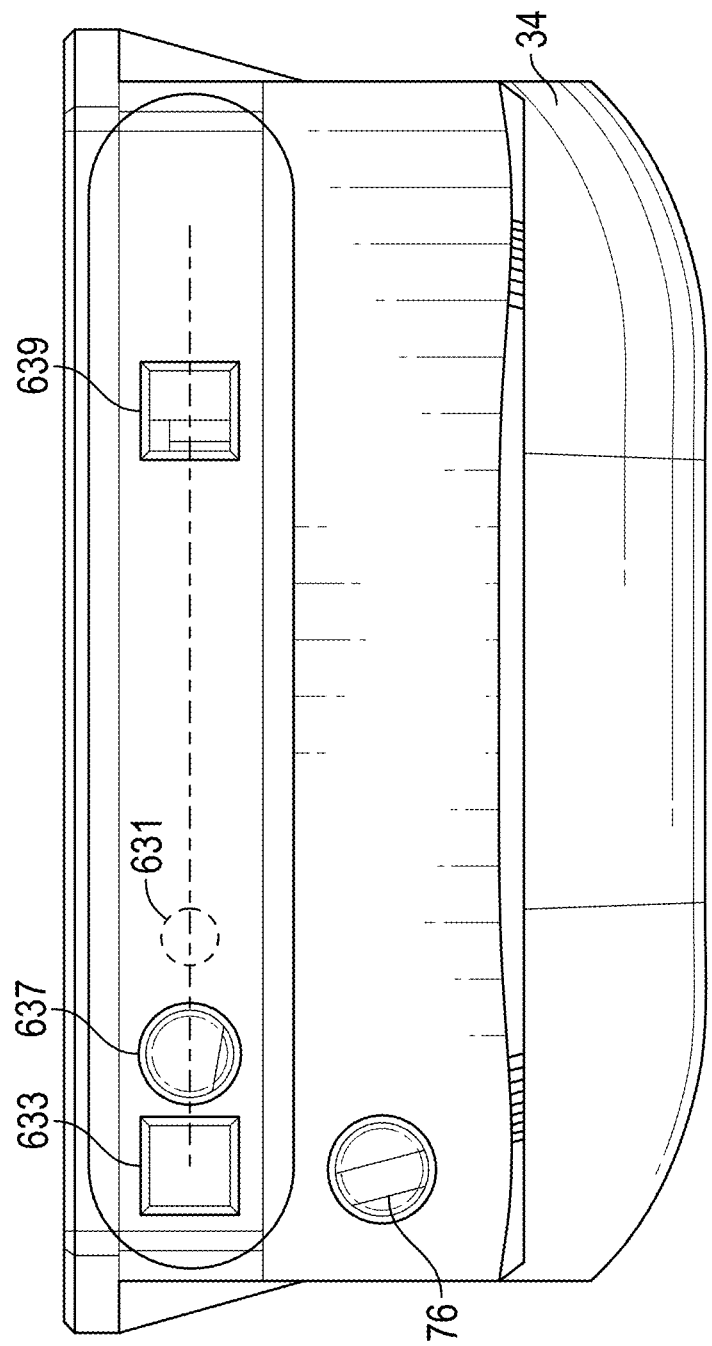
FIG. 14 is an enlarged view of a portion of the second end of FIG. 12.

Extending from the center portion 635 is a mobile device holder 641. The mobile device holder 641 is configured to securely couple a mobile device 643 to the housing 632. The holder 641 may include one or more fastening elements, such as a magnetic or mechanical latching element for example, that couples the mobile device 643 to the housing 632. In an embodiment, the mobile device 643 is coupled to communicate with a controller 668 (FIG. 10). The communication between the controller 668 and the mobile device 643 may be via any suitable communications medium, such as wired, wireless or optical communication mediums for example.

In the illustrated embodiment, the holder 641 is pivotally coupled to the housing 632, such that it may be selectively rotated into a closed position within a recess 646. In an embodiment, the recess 646 is sized and shaped to receive the holder 641 with the mobile device 643 disposed therein.

In the exemplary embodiment, the second end 648 includes a plurality of exhaust vent openings 656. In an embodiment, shown in FIGS. 11-14, the exhaust vent openings 656 are fluidly coupled to intake vent openings 658 arranged on a bottom surface 662 of center portion 635. The intake vent openings 658 allow external air to enter a conduit 664 having an opposite opening 666 in fluid communication with the hollow interior 667 of the body 634. In an embodiment, the opening 666 is arranged adjacent to a controller 668 which has one or more processors that is operable to perform the methods described herein. In an embodiment, the external air flows from the opening 666 over or around the controller 668 and out the exhaust vent openings 656.

In an embodiment, the controller 668 is coupled to a wall 670 of body 634. In an embodiment, the wall 670 is coupled to or integral with the handle 636. The controller 668 is electrically coupled to the 2D laser scanner 650, the 3D camera 660, a power source 672, an inertial measurement unit (IMU) 674, a laser line projector 776 (FIG. 13), and a haptic feedback device 677.

Figure 15:
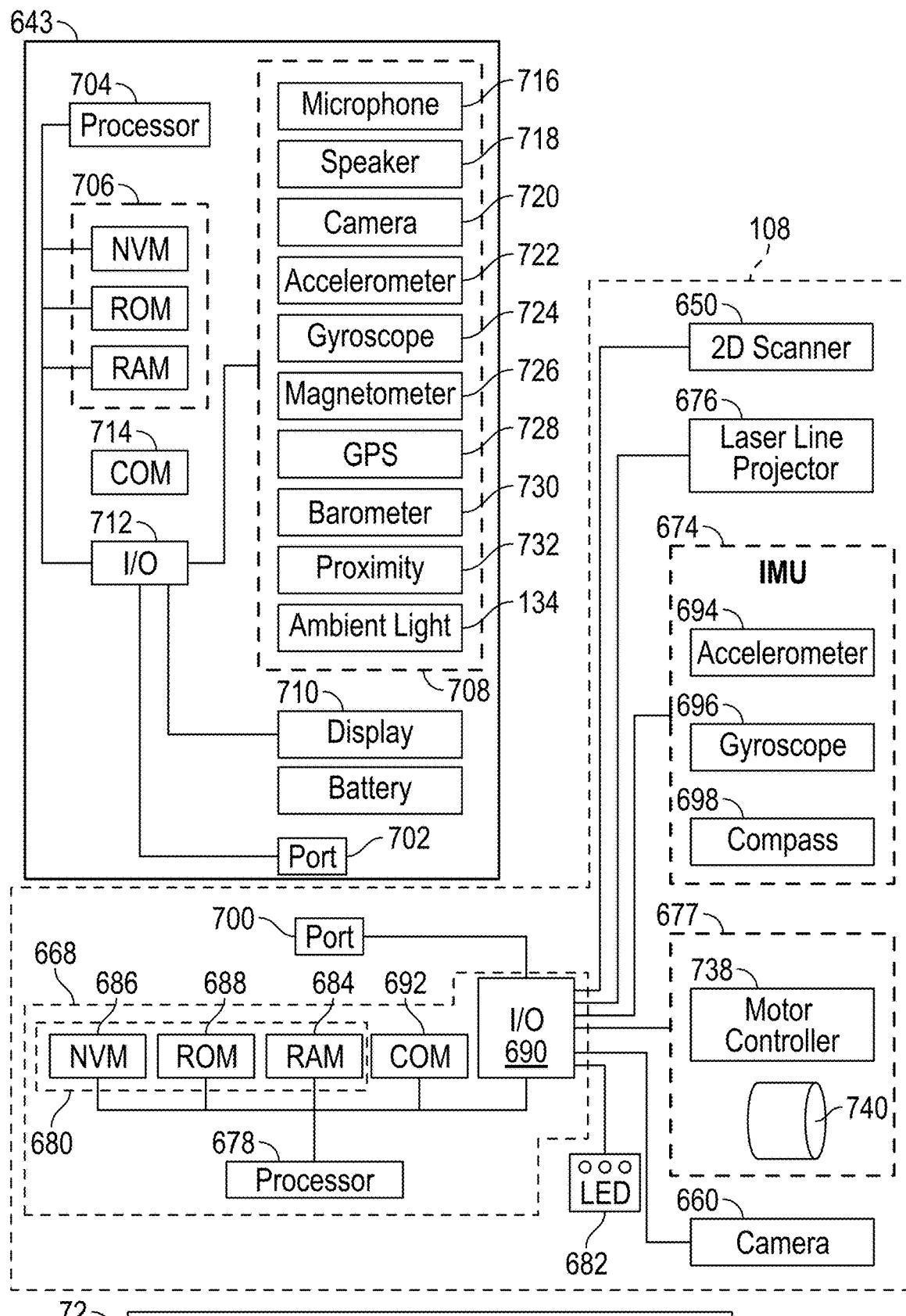
FIG. 15 is a block diagram of the system of FIG. 6 and FIG. 12.

Referring now to FIG. 15 with continuing reference to FIGS. 6-14, elements are shown of the system 108 with the mobile device 643 installed or coupled to the housing 632. Controller 668 is a suitable electronic device capable of accepting data and instructions, executing the instructions to process the data, and presenting the results. The controller 668 includes one or more processing elements 678. The processors may be microprocessors, field programmable gate arrays (FPGAs), digital signal processors (DSPs), and generally any device capable of performing computing functions. The one or more processors 678 have access to memory 680 for storing information.

Controller 668 is capable of converting the analog voltage or current level provided by 2D laser scanner 650, camera 660 and IMU 674 into a digital signal to determine a distance from the system 108 to an object in the environment. In an embodiment, the camera 660 is a 3D or RGBD type camera. Controller 668 uses the digital signals that act as input to various processes for controlling the system 108. The digital signals represent one or more system 108 data including but not limited to distance to an object, images of the environment, acceleration, pitch orientation, yaw orientation and roll orientation. As will be discussed in more detail, the digital signals may be from components internal to the housing 632 or from sensors and devices located in the mobile device 643.

In general, when the mobile device 643 is not installed, controller 668 accepts data from 2D laser scanner 650 and IMU 674 and is given certain instructions for the purpose of generating a two-dimensional map of a scanned environment. Controller 668 provides operating signals to the 2D laser scanner 650, the camera 660, laser line projector 676 and haptic feedback device 677. Controller 668 also accepts data from IMU 674, indicating, for example, whether the operator is operating in the system in the desired orientation. The controller 668 compares the operational parameters to predetermined variances (e.g. yaw, pitch or roll thresholds) and if the predetermined variance is exceeded, generates a signal that activates the haptic feedback device 677. The data received by the controller 668 may be displayed on a user interface coupled to controller 668. The user interface may be one or more LEDs (light-emitting diodes) 682, an LCD (liquid-crystal diode) display, a CRT (cathode ray tube) display, or the like. A keypad may also be coupled to the user interface for providing data input to controller 668. In one embodiment, the user interface is arranged or executed on the mobile device 643.

The controller 668 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet(^) Protocol), RS-232, ModBus, and the like. Additional systems 108 may also be connected to LAN with the controllers 668 in each of these systems 108 being configured to send and receive data to and from remote computers and other systems 108. The LAN may be connected to the Internet. This connection allows controller 668 to communicate with one or more remote computers connected to the Internet.

The processors 678 are coupled to memory 680. The memory 680 may include random access memory (RAM) device 684, a non-volatile memory (NVM) device 686, a read-only memory (ROM) device 688. In addition, the processors 678 may be connected to one or more input/output (I/O) controllers 690 and a communications circuit 692. In an embodiment, the communications circuit 692 provides an interface that allows wireless or wired communication with one or more external devices or networks, such as the LAN discussed above or the communications circuit 118.

Controller 68 includes operation control methods embodied in application code such as that shown or described with reference to FIGS. 16-19. These methods are embodied in computer instructions written to be executed by processors 678, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C #, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 668 is the 2D laser scanner 650. The 2D scanner 50 measures 2D coordinates in a plane. In the exemplary embodiment, the scanning is performed by steering light within a plane to illuminate object points in the environment. The 2D laser scanner 650 collects the reflected (scattered) light from the object points to determine 2D coordinates of the object points in the 2D plane. In an embodiment, the 2D laser scanner 650 scans a spot of light over an angle while at the same time measuring an angle value and corresponding distance value to each of the illuminated object points.

Examples of 2D laser scanners 650 include, but are not limited to Model LMS100 scanners manufactured by Sick, Inc of Minneapolis, Minn. and scanner Models URG-04LX-UG01 and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D laser scanner 650 is oriented so as to scan a beam of light over a range of angles in a generally horizontal plane (relative to the floor of the environment being scanned). At instants in time the 2D laser scanner 650 returns an angle reading and a corresponding distance reading to provide 2D coordinates of object points in the horizontal plane. In completing one scan over the full range of angles, the 2D laser scanner returns a collection of paired angle and distance readings. As the system 30 is moved from place to place, the 2D laser scanner 650 continues to return 2D coordinate values. These 2D coordinate values are used to locate the position of the system 108 thereby enabling the generation of a two-dimensional map or floorplan of the environment.

Also coupled to the controller 686 is the IMU 674. The IMU 674 is a position/orientation sensor that may include accelerometers 694 (inclinometers), gyroscopes 696, a magnetometers or compass 698, and altimeters. In the exemplary embodiment, the IMU 674 includes multiple accelerometers 694 and gyroscopes 696. The compass 698 indicates a heading based on changes in magnetic field direction relative to the earth's magnetic north. The IMU 674 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 674 determines the pose or orientation of the system 108 about three-axis to allow a determination of a yaw, roll and pitch parameter.

In the embodiment shown in FIGS. 11-14, the system 108 further includes a camera 660 that is a 3D or RGB-D camera.

As used herein, the term 3D camera refers to a device that produces a two-dimensional image that includes distances to a point in the environment from the location of system 108. The 3D camera 108 may be a range camera or a stereo camera. In an embodiment, the 3D camera 108 includes an RGB-D sensor that combines color information with a per-pixel depth information. In an embodiment, the 3D camera 108 may include an infrared laser projector 631 (FIG. 14), a left infrared camera 633, a right infrared camera 639, and a color camera 637. In an embodiment, the 3D camera 660 is a RealSense™ camera model R200 manufactured by Intel Corporation.

In an embodiment, when the mobile device 643 is coupled to the housing 632, the mobile device 643 becomes an integral part of the system 108. In an embodiment, the mobile device 643 is a cellular phone, a tablet computer or a personal digital assistant (PDA). The mobile device 643 may be coupled for communication via a wired connection, such as ports 700, 702. The port 700 is coupled for communication to the processor 678, such as via I/O controller 690 for example. The ports 700, 702 may be any suitable port, such as but not limited to USB, USB-A, USB-B, USB-C, IEEE 1394 (Firewire), or Lightning™ connectors.

The mobile device 643 is a suitable electronic device capable of accepting data and instructions, executing the instructions to process the data, and presenting the results. The mobile device 643 includes one or more processing elements 704. The processors may be microprocessors, field programmable gate arrays (FPGAs), digital signal processors (DSPs), and generally any device capable of performing computing functions. The one or more processors 704 have access to memory 106 for storing information.

The mobile device 643 is capable of converting the analog voltage or current level provided by sensors 708 and processor 678. Mobile device 643 uses the digital signals that act as input to various processes for controlling the system 108. The digital signals represent one or more system 30 data including but not limited to distance to an object, images of the environment, acceleration, pitch orientation, yaw orientation, roll orientation, global position, ambient light levels, and altitude for example.

In general, mobile device 643 accepts data from sensors 708 and is given certain instructions for the purpose of generating or assisting the processor 678 in the generation of a two-dimensional map or three-dimensional map of a scanned environment. Mobile device 643 provides operating signals to the processor 678, the sensors 708 and a display 710. Mobile device 643 also accepts data from sensors 708, indicating, for example, to track the position of the mobile device 643 in the environment or measure coordinates of points on surfaces in the environment. The mobile device 643 compares the operational parameters to predetermined variances (e.g. yaw, pitch or roll thresholds) and if the predetermined variance is exceeded, may generate a signal. The data received by the mobile device 643 may be displayed on display 710. In an embodiment, the display 710 is a touch screen device that allows the operator to input data or control the operation of the system 108.

The controller 668 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet(`) Protocol), RS-232, ModBus, and the like. Additional systems 108 may also be connected to LAN with the controllers 668 in each of these systems 108 being configured to send and receive data to and from remote computers and other systems 108. The LAN may be connected to the Internet. This connection allows controller 668 to communicate with one or more remote computers connected to the Internet.

The processors 704 are coupled to memory 706. The memory 706 may include random access memory (RAM) device, a non-volatile memory (NVM) device, and a read-only memory (ROM) device. In addition, the processors 704 may be connected to one or more input/output (I/O) controllers 712 and a communications circuit 714. In an embodiment, the communications circuit 714 provides an interface that allows wireless or wired communication with one or more external devices or networks, such as the LAN or the cellular network discussed above.

Controller 668 includes operation control methods embodied in application code shown or described with reference to FIGS. 16-19. These methods are embodied in computer instructions written to be executed by processors 678, 704, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C #, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Also coupled to the processor 704 are the sensors 708. The sensors 708 may include but are not limited to: a microphone 716; a speaker 718; a front or rear facing camera 720; accelerometers 722 (inclinometers), gyroscopes 724, a magnetometers or compass 726; a global positioning satellite (GPS) module 728; a barometer 730; a proximity sensor 732; and an ambient light sensor 734. By combining readings from a combination of sensors 708 with a fusion algorithm that may include a Kalman filter, relatively accurate position and orientation measurements can be obtained.

It should be appreciated that the sensors 660, 674 integrated into the scanner 108 may have different characteristics than the sensors 708 of mobile device 643. For example, the resolution of the cameras 660, 720 may be different, or the accelerometers 694, 722 may have different dynamic ranges, frequency response, sensitivity (mV/g) or temperature parameters (sensitivity or range). Similarly, the gyroscopes 696, 724 or compass/magnetometer may have different characteristics. It is anticipated that in some embodiments, one or more sensors 708 in the mobile device 643 may be of higher accuracy than the corresponding sensors 674 in the system 108. As described in more detail herein, in some embodiments the processor 678 determines the characteristics of each of the sensors 708 and compares them with the corresponding sensors in the system 108 when the mobile device. The processor 678 then selects which sensors 674, 708 are used during operation. In some embodiments, the mobile device 643 may have additional sensors (e.g. microphone 716, camera 720) that may be used to enhance operation compared to operation of the system 108 without the mobile device 643. In still further embodiments, the system 108 does not include the IMU 674 and the processor 678 uses the sensors 708 for tracking the position and orientation/pose of the system 108. In still further embodiments, the addition of the mobile device 643 allows the system 108 to utilize the camera 720 to perform three-dimensional (3D) measurements either directly (using an RGB-D camera) or using photogrammetry techniques to generate 3D maps. In an embodiment, the processor 678 uses the communications circuit (e.g. a cellular 4G internet connection) to transmit and receive data from remote computers or devices.

In the exemplary embodiment, the system 108 is a handheld portable device that is sized and weighted to be carried by a single person during operation. Therefore, the plane 736 (FIG. 22) in which the 2D scanner 650 projects a light beam may not be horizontal relative to the floor or may continuously change as the computer moves during the scanning process. Thus, the signals generated by the accelerometers 694, gyroscopes 696 and compass 698 (or the corresponding sensors 708) may be used to determine the pose (yaw, roll, tilt) of the system 108 and determine the orientation of the plane 651.

In an embodiment, it may be desired to maintain the pose of the system 108 (and thus the plane 736) within predetermined thresholds relative to the yaw, roll and pitch orientations of the system 108. In an embodiment, a haptic feedback device 677 is disposed within the housing 632, such as in the handle 636. The haptic feedback device 677 is a device that creates a force, vibration or motion that is felt or heard by the operator. The haptic feedback device 677 may be, but is not limited to: an eccentric rotating mass vibration motor or a linear resonant actuator for example. The haptic feedback device is used to alert the operator that the orientation of the light beam from 2D laser scanner 650 is equal to or beyond a predetermined threshold. In operation, when the IMU 674 measures an angle (yaw, roll, pitch or a combination thereof), the controller 668 transmits a signal to a motor controller 738 that activates a vibration motor 740. Since the vibration originates in the handle 636, the operator will be notified of the deviation in the orientation of the system 108. The vibration continues until the system 108 is oriented within the predetermined threshold or the operator releases the actuator 638. In an embodiment, it is desired for the plane 736 to be within 10-15 degrees of horizontal (relative to the ground) about the yaw, roll and pitch axes.

Figure 16:
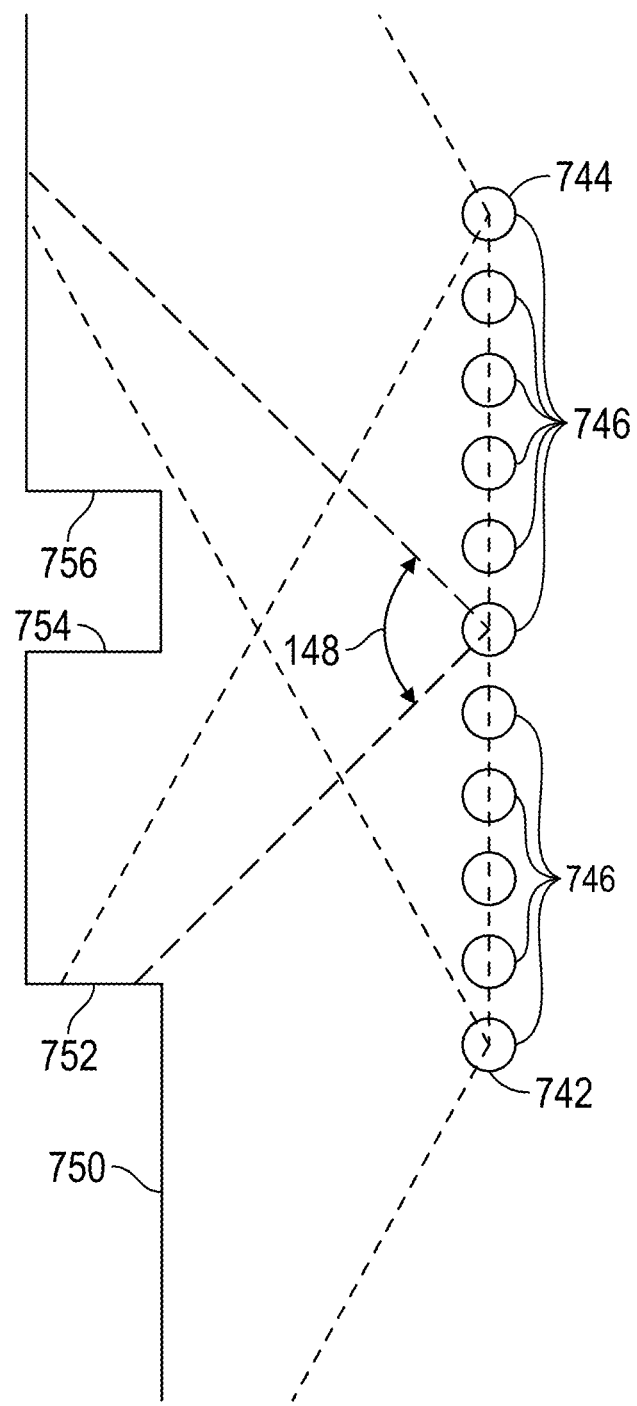
FIG. 16-18 are schematic illustrations of the operation of system of FIG. 6 in accordance with an embodiment.

In an embodiment, the 2D laser scanner 650 makes measurements as the system 108 is moved about an environment, such from a first position 742 to a second registration position 744 as shown in FIG. 16. In an embodiment, 2D scan data is collected and processed as the system 108 passes through a plurality of 2D measuring positions 746. At each measuring position 746, the 2D laser scanner 650 collects 2D coordinate data over an effective FOV 748. Using methods described in more detail below, the controller 668 uses 2D scan data from the plurality of 2D scans at positions 746 to determine a position and orientation of the system 108 as it is moved about the environment. In an embodiment, the common coordinate system is represented by 2D Cartesian coordinates x, y and by an angle of rotation θ relative to the x or y axis. In an embodiment, the x and y axes lie in the plane of the 2D scanner and may be further based on a direction of a "front" of the 2D laser scanner 650.

Figure 17:
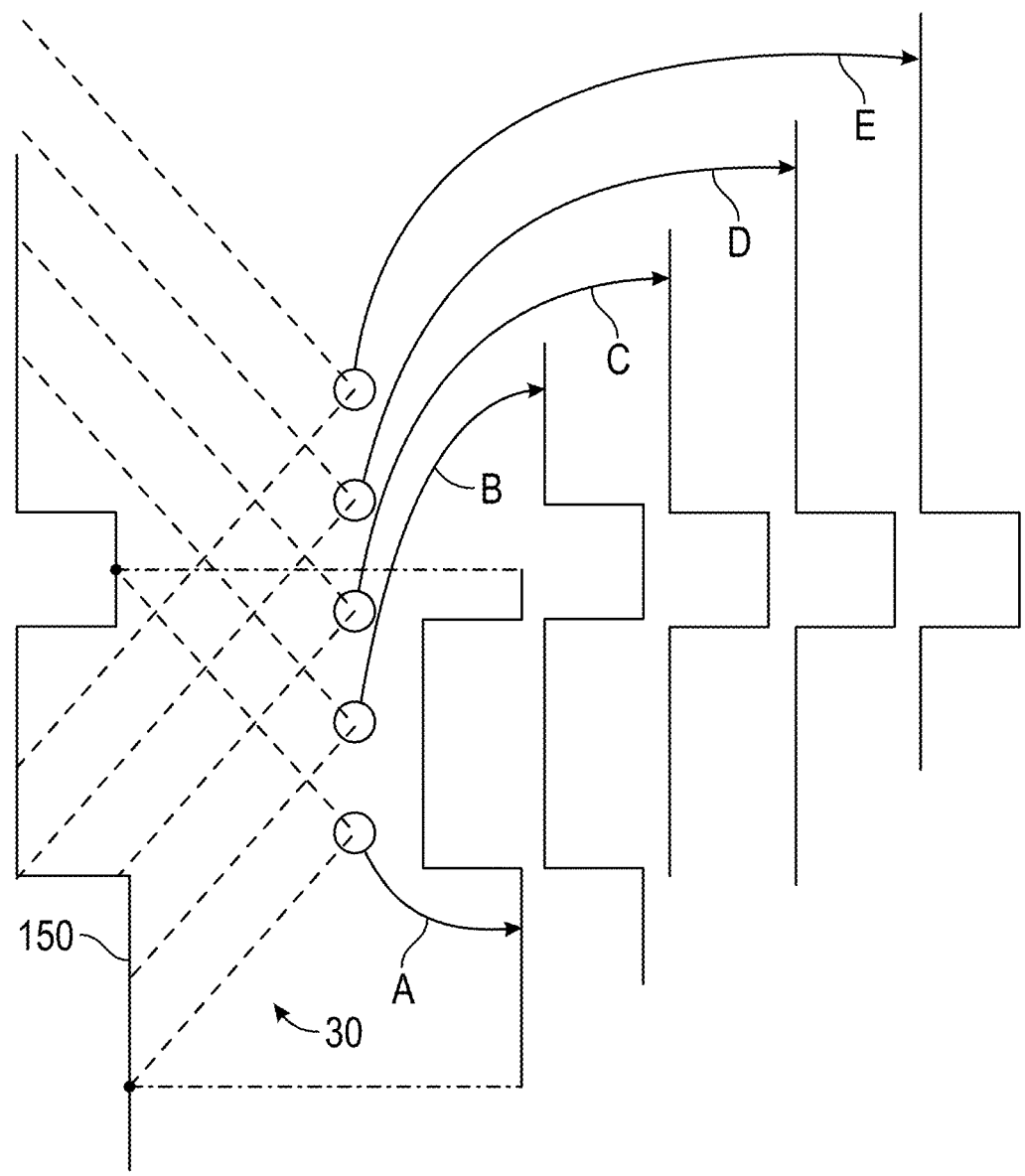
Figure 18:
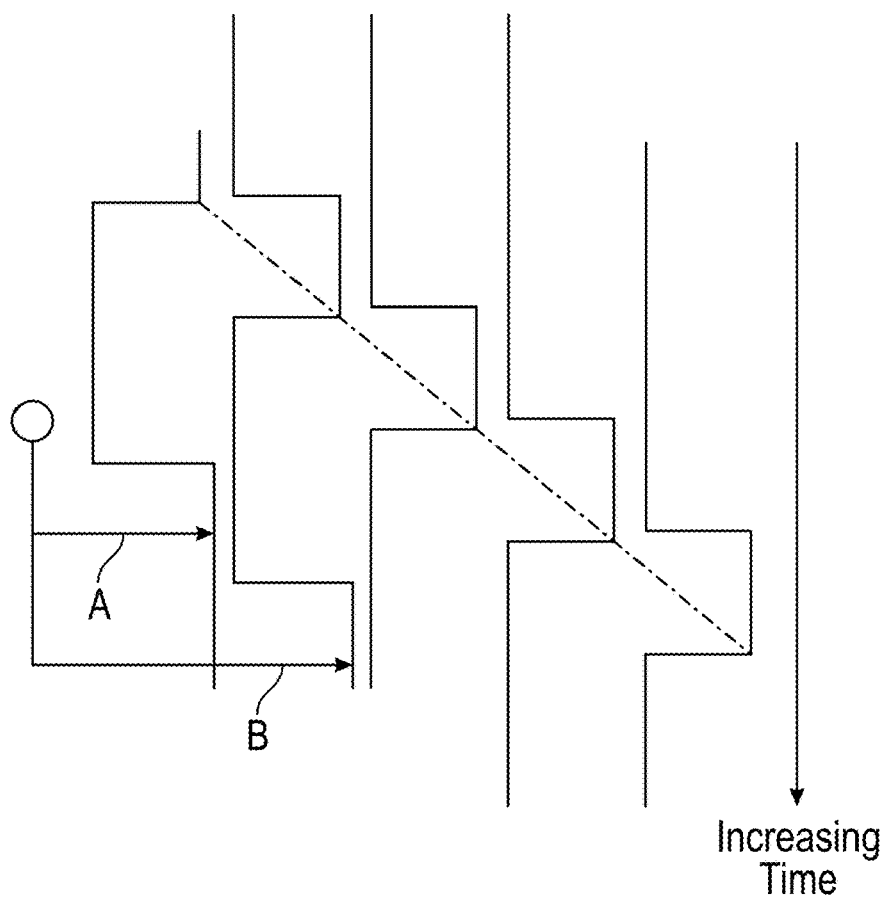

FIG. 18 shows the 2D system 108 collecting 2D scan data at selected positions 746 over an effective FOV 748. At different positions 746, the 2D laser scanner 650 captures a portion of the object 750 marked A, B, C, D, and E (FIG. 17). FIG. 18 shows 2D scanner 650 moving in time relative to a fixed frame of reference of the object 750.

FIG. 18 includes the same information as FIG. 17 but shows it from the frame of reference of the system 108 rather than the frame of reference of the object 750. FIG. 18 illustrates that in the system 108 frame of reference, the position of features on the object change over time. Therefore, the distance traveled by the system 108 can be determined from the 2D scan data sent from the 2D laser scanner 650 to the controller 668.

As the 2D laser scanner 650 takes successive 2D readings and performs best-fit calculations, the controller 668 keeps track of the translation and rotation of the 2D laser scanner 650, which is the same as the translation and rotation of the system 108. In this way, the controller 668 is able to accurately determine the change in the values of x, y, θ as the system 108 moves from the first position 742 to the second position 744.

In an embodiment, the controller 668 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 752, 754, and 756 shown in FIG. 16. The mathematical criterion may involve processing of the raw data provided by the 2D laser scanner 650 to the controller 668, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane 736 of the light beam from 2D laser scanner 650 remains horizontal relative to the ground plane, the first translation value is dx, the second translation value is dy, and the first rotation value dθ. If the first scan data is collected with the 2D laser scanner 650 having translational and rotational coordinates (in a reference coordinate system) of $(x_1, y_1, \theta_1)$, then when the second 2D scan data is collected at a second location the coordinates are given by $(x_2, y_2, \theta_2)=(x_1+dx, y_1+dy, \theta_1+d\theta)$. In an embodiment, the controller 668 is further configured to determine a third translation value (for example, dz) and a second and third rotation values (for example, pitch and roll). The third translation value, second rotation value, and third rotation value may be determined based at least in part on readings from the IMU 674.

The 2D laser scanner 650 collects 2D scan data starting at the first position 742 and more 2D scan data at the second position 744. In some cases, these scans may suffice to determine the position and orientation of the system 30 at the second position 744 relative to the first position 742. In other cases, the two sets of 2D scan data are not sufficient to enable the controller 668 to accurately determine the first translation value, the second translation value, and the first rotation value. This problem may be avoided by collecting 2D scan data at intermediate scan positions 746. In an embodiment, the 2D scan data is collected and processed at regular intervals, for example, once per second. In this way, features in the environment are identified in successive 2D scans at positions 746. In an embodiment, when more than two 2D scans are obtained, the controller 668 may use the information from all the successive 2D scans in determining the translation and rotation values in moving from the first position 742 to the second position 744. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the system 108 is moved beyond the second position 744, a two-dimensional image or map of the environment being scanned may be generated.

Figure 19:
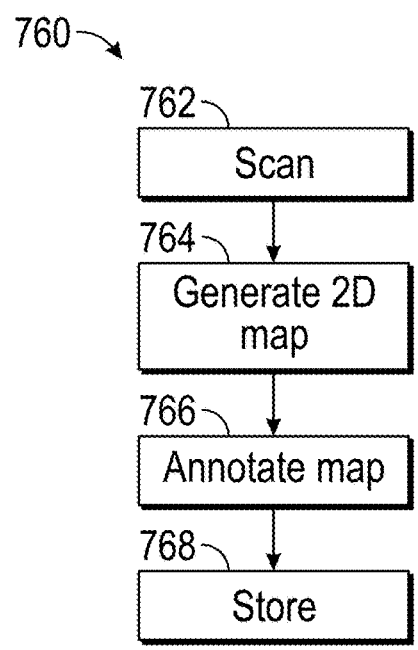
FIG. 19 is a flow diagram of a method of generating a two-dimensional map of an environment.
Figure 20:
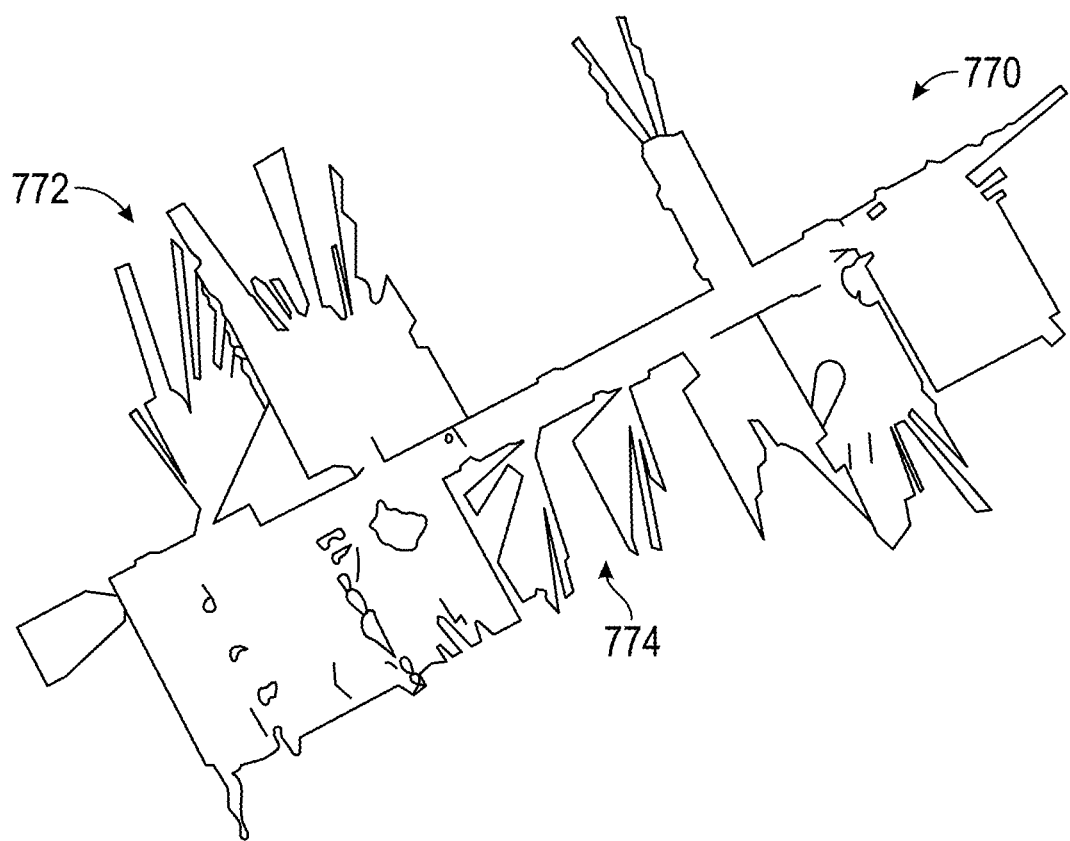
FIGS. 20-21 are plan views of stages of a two-dimensional map generated with the method of FIG. 14 in accordance with an embodiment.

Referring now to FIG. 19, a method 760 is shown for generating a two-dimensional map with annotations. The method 760 starts in block 762 where the facility or area is scanned to acquire scan data 770, such as that shown in FIG. 20. The scanning is performed by carrying the system 108 through the area to be scanned. The system 108 measures distances from the system 108 to an object, such as a wall for example, and also a pose of the system 108 in an embodiment where the user interacts with the system 108 via actuator 638. In the illustrated embodiments, the mobile device 643 provides a user interface that allows the operator to initiate the functions and control methods described herein. Using the registration process described herein, the two dimensional locations of the measured points on the scanned objects (e.g. walls, doors, windows, cubicles, file cabinets etc.) may be determined. It is noted that the initial scan data may include artifacts, such as data that extends through a window 772 or an open door 774 for example. Therefore, the scan data 770 may include additional information that is not desired in a 2D map or layout of the scanned area.

Figure 21:
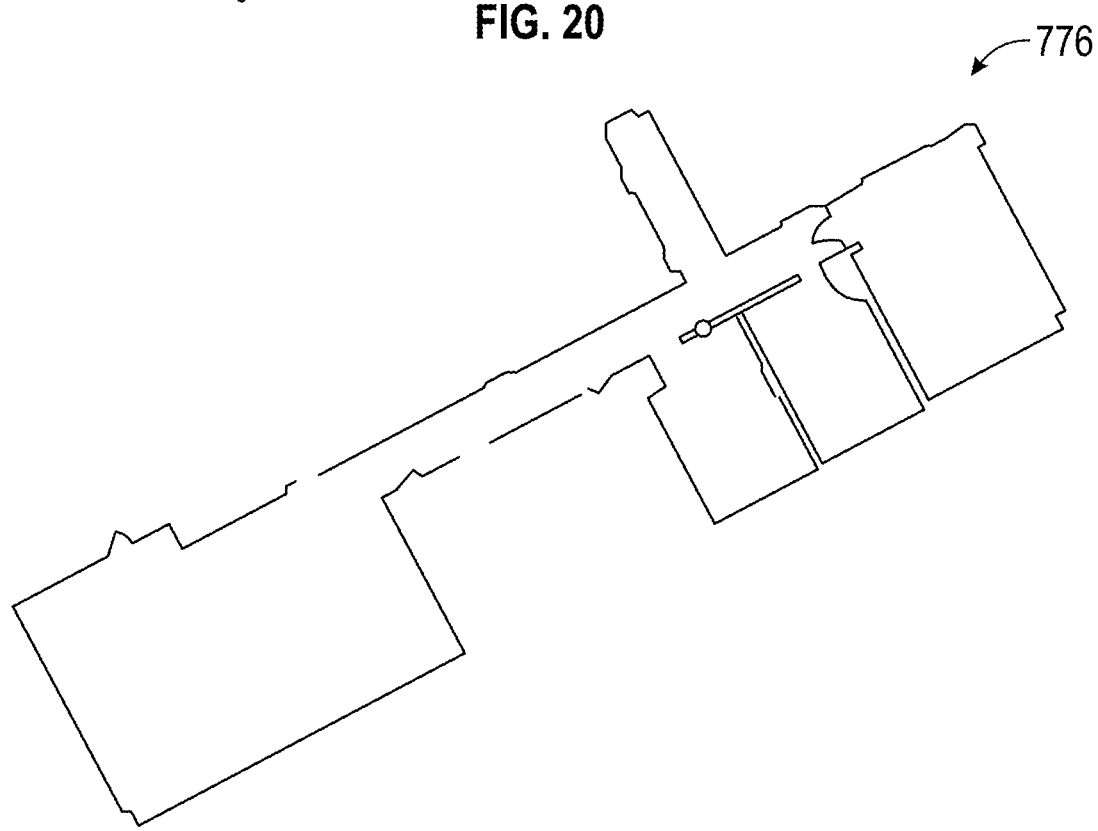

The method 760 then proceeds to block 764 where a 2D map 776 is generated of the scanned area as shown in FIG. 21. The generated 2D map 776 represents a scan of the area, such as in the form of a floor plan without the artifacts of the initial scan data. It should be appreciated that the 2D map 776 represents a dimensionally accurate representation of the scanned area that may be used by the mobile scanning platform 100 to navigate through the environment. In the embodiment of FIG. 19, the method 760 then proceeds to block 766 where optional user-defined annotations are made to the 2D maps 776 to define an annotated 2D map that includes information, such as dimensions of features, the location of doors, the relative positions of objects (e.g. liquid oxygen tanks, entrances/exits or egresses or other notable features such as but not limited to the location of automated sprinkler systems, knox or key boxes, or fire department connection points ("FDC"). As described in more detail herein, the annotation may also be used to define scan locations where the mobile scanning platform 100 stops and uses the 3D scanner 110 to perform a scan of the environment.

Once the annotations of the 2D annotated map are completed, the method 760 then proceeds to block 768 where the 2D map is stored in memory, such as nonvolatile memory 686 for example. The 2D map may also be stored in a network accessible storage device or server so that it may be accessed by the desired personnel.

Figure 22:
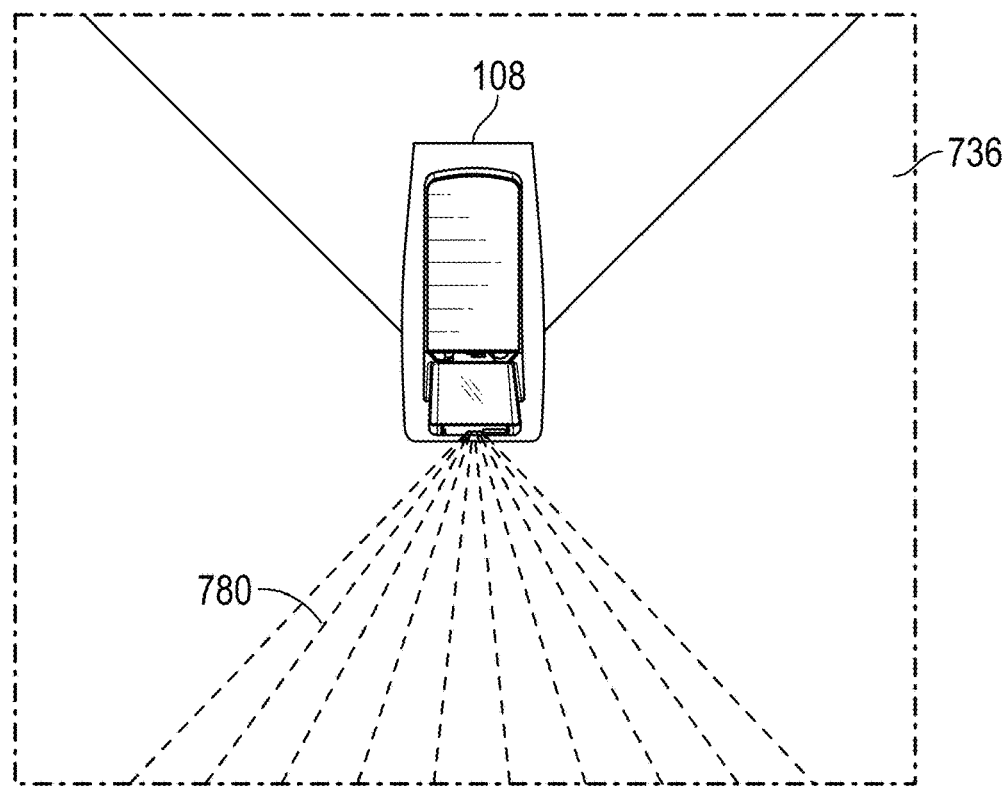
FIG. 22-23 are schematic views of the operation of the system of FIG. 6 in accordance with an embodiment.
Figure 23:
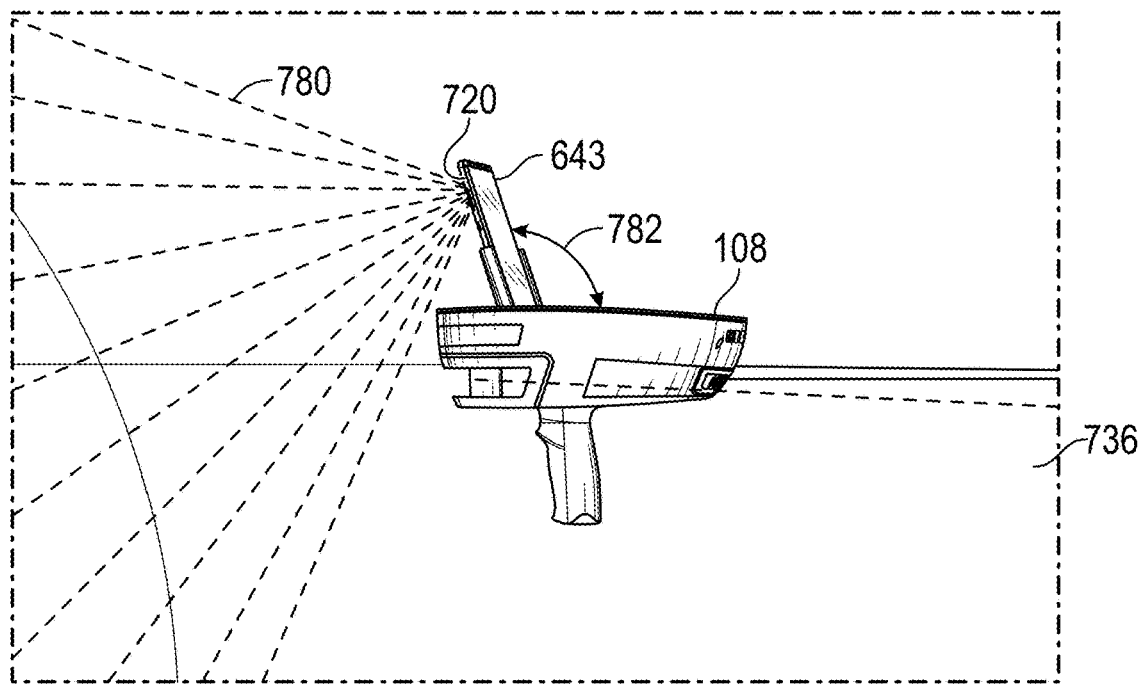

Referring now to FIG. 22 and FIG. 23 an embodiment is illustrated with the mobile device 643 coupled to the system 108. As described herein, the 2D laser scanner 650 emits a beam of light in the plane 736. The 2D laser scanner 650 has a field of view (FOV) that extends over an angle that is less than 360 degrees. In the exemplary embodiment, the FOV of the 2D laser scanner is about 270 degrees. In this embodiment, the mobile device 643 is coupled to the housing 632 adjacent the end where the 2D laser scanner 650 is arranged. The mobile device 643 includes a forward facing camera 720. The camera 720 is positioned adjacent a top side of the mobile device and has a predetermined field of view 780. In the illustrated embodiment, the holder 641 couples the mobile device 643 on an obtuse angle 782. This arrangement allows the mobile device 643 to acquire images of the floor and the area directly in front of the system 108 (e.g. the direction the operator is moving the system 108).

In embodiments where the camera 720 is a RGB-D type camera, three-dimensional coordinates of surfaces in the environment may be directly determined in a mobile device coordinate frame of reference. In an embodiment, the holder 641 allows for the mounting of the mobile device 643 in a stable position (e.g. no relative movement) relative to the 2D laser scanner 650. When the mobile device 643 is coupled to the housing 632, the processor 678 performs a calibration of the mobile device 643 allowing for a fusion of the data from sensors 708 with the sensors of system 108. As a result, the coordinates of the 2D laser scanner may be transformed into the mobile device coordinate frame of reference or the 3D coordinates acquired by camera 720 may be transformed into the 2D scanner coordinate frame of reference.

In an embodiment, the mobile device is calibrated to the 2D laser scanner 650 by assuming the position of the mobile device based on the geometry and position of the holder 641 relative to 2D laser scanner 650. In this embodiment, it is assumed that the holder that causes the mobile device to be positioned in the same manner. It should be appreciated that this type of calibration may not have a desired level of accuracy due to manufacturing tolerance variations and variations in the positioning of the mobile device 643 in the holder 641. In another embodiment, a calibration is performed each time a different mobile device 643 is used. In this embodiment, the user is guided (such as via the user interface 710) to direct the system 108 to scan a specific object, such as a door, that can be readily identified in the laser readings of the system 108 and in the camera-sensor 720 using an object recognition method.

Referring now to FIGS. 24-26, an embodiment is shown of a laser scanner 110. In this embodiment, the laser scanner 110 has a measuring head 2422 and a base 2424. The measuring head 2422 is mounted on the base 2424 such that the laser scanner 110 may be rotated about a vertical axis 2423. In one embodiment, the measuring head 2422 includes a gimbal point 2427 that is a center of rotation about the vertical axis 2423 and a horizontal axis 2425. The measuring head 2422 has a rotary mirror 2426, which may be rotated about the horizontal axis 2425. The rotation about the vertical axis may be about the center of the base 2424. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 2422 is further provided with an electromagnetic radiation emitter, such as light emitter 2428, for example, that emits an emitted light beam 2430. In one embodiment, the emitted light beam 2430 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 2430 is amplitude or intensity modulated, for example, with a sinusoidal waveform or with a rectangular waveform. The emitted light beam 2430 is emitted by the light emitter 2428 onto a beam steering unit, such as mirror 2426, where it is deflected to the environment. A reflected light beam 2432 is reflected from the environment by an object 2434. The reflected or scattered light is intercepted by the rotary mirror 2426 and directed into a light receiver 2436. The directions of the emitted light beam 2430 and the reflected light beam 2432 result from the angular positions of the rotary mirror 2426 and the measuring head 2422 about the axes 2425, 2423, respectively. These angular positions in turn depend on the corresponding rotary drives or motors.

Coupled to the light emitter 2428 and the light receiver 2436 is a controller 2438. The controller 738 determines, for a multitude of measuring points X, a corresponding number of distances d between the laser scanner 110 and the points X on object 2434. The distance to a particular point X is determined based at least in part on the speed of light in air through which electromagnetic radiation propagates from the device to the object point X. In one embodiment the phase shift of modulation in light emitted by the laser scanner 110 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 110 takes place by rotating the rotary mirror 2426 relatively quickly about axis 2425 while rotating the measuring head 2422 relatively slowly about axis 2423, thereby moving the assembly in a spiral pattern. In an exemplary embodiment, the rotary mirror rotates at a maximum speed of 5820 revolutions per minute. For such a scan, the gimbal point 2427 defines the origin of the local stationary reference system. The base 2424 rests in this local stationary reference system.

In addition to measuring a distance d from the gimbal point 2427 to an object point X, the scanner 110 may also collect gray-scale information related to the received optical power (equivalent to the term "brightness.") The gray-scale value may be determined at least in part, for example, by integration of the bandpass-filtered and amplified signal in the light receiver 2436 over a measuring period attributed to the object point X.

The measuring head 2422 may include a display device 2440 integrated into the laser scanner 110. The display device 740 may include a graphical touch screen 2441, which allows the operator to set the parameters or initiate the operation of the laser scanner 110. For example, the screen 2441 may have a user interface that allows the operator to provide measurement instructions to the device, and the screen may also display measurement results.

The laser scanner 110 includes a carrying structure 2442 that provides a frame for the measuring head 2422 and a platform for attaching the components of the laser scanner 110. In one embodiment, the carrying structure 2442 is made from a metal such as aluminum. The carrying structure 2442 includes a traverse member 2444 having a pair of walls 2446, 2448 on opposing ends. The walls 2446, 2448 are parallel to each other and extend in a direction opposite the base 2424. Shells 2450, 2452 are coupled to the walls 2446, 2448 and cover the components of the laser scanner 110. In the exemplary embodiment, the shells 2450, 2452 are made from a plastic material, such as polycarbonate or polyethylene for example. The shells 2450, 2452 cooperate with the walls 2446, 2448 to form a housing for the laser scanner 110.

On an end of the shells 2450, 2452 opposite the walls 2446, 2448 a pair of yokes 2454, 2456 are arranged to partially cover the respective shells 2450, 2452. In the exemplary embodiment, the yokes 2454, 2456 are made from a suitably durable material, such as aluminum for example, that assists in protecting the shells 2450, 2452 during transport and operation. The yokes 2454, 2456 each includes a first arm portion 2458 that is coupled, such as with a fastener for example, to the traverse 2444 adjacent the base 2424. The arm portion 2458 for each yoke 2454, 2456 extends from the traverse 2444 obliquely to an outer corner of the respective shell 2450, 2452. From the outer corner of the shell, the yokes 2454, 2456 extend along the side edge of the shell to an opposite outer corner of the shell. Each yoke 2454, 2456 further includes a second arm portion that extends obliquely to the walls 2446,2448. It should be appreciated that the yokes 2454, 2456 may be coupled to the traverse 2442, the walls 2446, 2448 and the shells 2450, 2454 at multiple locations.

In an embodiment, on top of the traverse 2444, a prism 2460 is provided. The prism extends parallel to the walls 2446, 2448. In the exemplary embodiment, the prism 2460 is integrally formed as part of the carrying structure 2442. In other embodiments, the prism 2460 is a separate component that is coupled to the traverse 2444. When the mirror 2426 rotates, during each rotation the mirror 2426 directs the emitted light beam 2430 onto the traverse 2444 and the prism 2460. In some embodiments, due to non-linearities in the electronic components, for example in the light receiver 2436, the measured distances d may depend on signal strength, which may be measured in optical power entering the scanner or optical power entering optical detectors within the light receiver 2436, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 2436. Since the prism 2460 is at a known distance from the gimbal point 2427, the measured optical power level of light reflected by the prism 2460 may be used to correct distance measurements for other measured points, thereby allowing for compensation to correct for the effects of environmental variables such as temperature. In the exemplary embodiment, the resulting correction of distance is performed by the controller 2438.

In an embodiment, the base 2424 is coupled to a swivel assembly (not shown) such as that described in commonly owned U.S. Pat. No. 8,705,012 ('012), which is incorporated by reference herein. The swivel assembly is housed within the carrying structure 2442 and includes a motor that is configured to rotate the measuring head 2422 about the axis 2423. In an embodiment, the angular/rotational position of the measuring head 2422 about the axis 2423 is measured by angular encoder.

An auxiliary image acquisition device 2466 may be a device that captures and measures a parameter associated with the scanned area or the scanned object and provides a signal representing the measured quantities over an image acquisition area. The auxiliary image acquisition device 766 may be, but is not limited to, a pyrometer, a thermal imager, an ionizing radiation detector, or a millimeter-wave detector. In an embodiment, the auxiliary image acquisition device 766 is a color camera.

In an embodiment, a central color camera (first image acquisition device) 2412 is located internally to the scanner and may have the same optical axis as the 3D scanner device. In this embodiment, the first image acquisition device 2412 is integrated into the measuring head 2422 and arranged to acquire images along the same optical pathway as emitted light beam 2430 and reflected light beam 2432. In this embodiment, the light from the light emitter 2428 reflects off a fixed mirror 2416 and travels to dichroic beam-splitter 2418 that reflects the light 2417 from the light emitter 2428 onto the rotary mirror 2426. In an embodiment, the mirror 2426 is rotated by a motor 2436 and the angular/rotational position of the mirror is measured by angular encoder 2434. The dichroic beam-splitter 2418 allows light to pass through at wavelengths different than the wavelength of light 2417. For example, the light emitter 2428 may be a near infrared laser light (for example, light at wavelengths of 780 nm or 1150 nm), with the dichroic beam-splitter 2418 configured to reflect the infrared laser light while allowing visible light (e.g., wavelengths of 400 to 700 nm) to transmit through. In other embodiments, the determination of whether the light passes through the beam-splitter 2418 or is reflected depends on the polarization of the light. The digital camera 2412 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 2423 and by steering the mirror 2426 about the axis 2425.

Figure 27B:
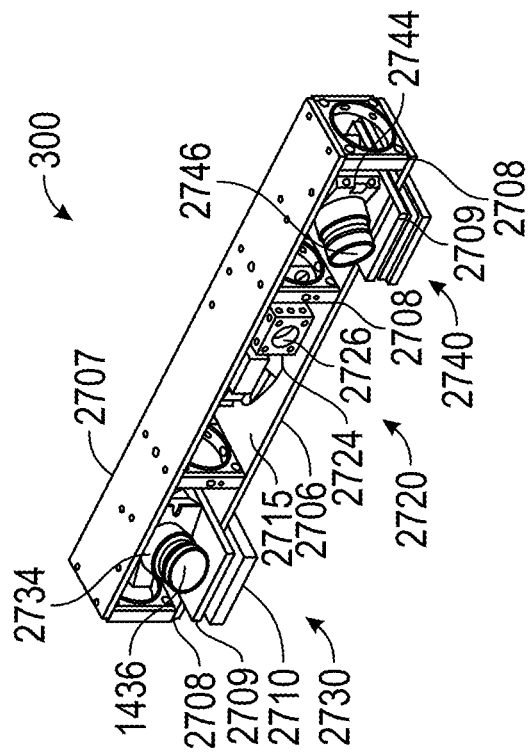
FIGS. 27A-27D are views of a triangulation scanner for use with the mobile scanning platform of FIG. 3 in accordance with an embodiment.
Figure 27D:
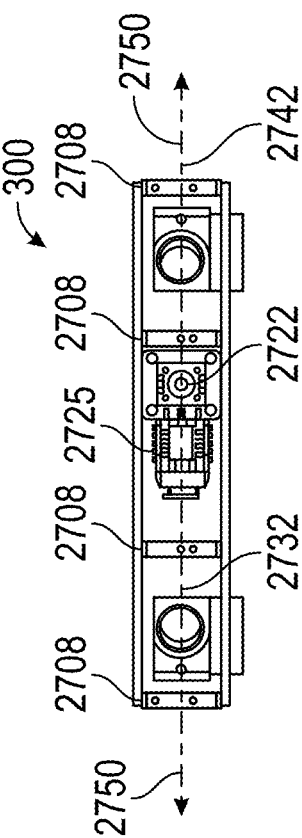
Figure 27A:
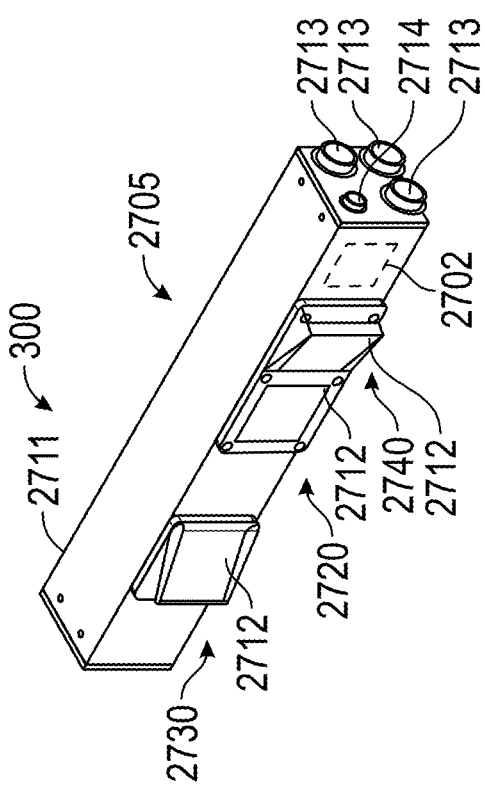
Figure 27C:
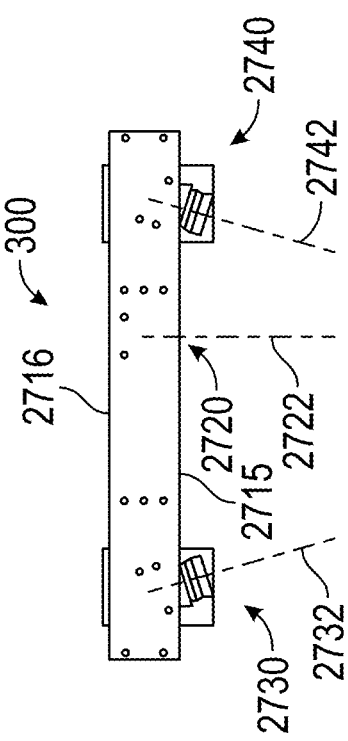

In an embodiment, the area or triangulation scanner 300 are the scanner shown in FIGS. 27A-27D. In this embodiment, the area scanner 300 includes a body 2705, a projector 2720, a first camera 2730, and a second camera 2740. In an embodiment, the projector optical axis 2722 of the projector 2720, the first-camera optical axis 2732 of the first camera 1430, and the second-camera optical axis 1442 of the second camera 1440 all lie on a common plane 2750, as shown in FIGS. 27C, 27D. In some embodiments, an optical axis passes through a center of symmetry of an optical system, which might be a projector or a camera, for example. For example, an optical axis may pass through a center of curvature of lens surfaces or mirror surfaces in an optical system. The common plane 2750, also referred to as a first plane 2750, extends perpendicular into and out of the paper in FIG. 27D.

In an embodiment, the body 2705 includes a bottom support structure 2706, a top support structure 2707, spacers 2708, camera mounting plates 2709, bottom mounts 2710, dress cover 2711, windows 2712 for the projector and cameras, Ethernet connectors 2713, and GPIO connector 2714. In addition, the body includes a front side 2715 and a back side 2716. In an embodiment, the bottom support structure and the top support structure are flat plates made of carbon-fiber composite material. In an embodiment, the carbon-fiber composite material has a low coefficient of thermal expansion (CTE). In an embodiment, the spacers 2708 are made of aluminum and are sized to provide a common separation between the bottom support structure and the top support structure.

In an embodiment, the projector 2720 includes a projector body 2724 and a projector front surface 1426. In an embodiment, the projector 2720 includes a light source 2725 that attaches to the projector body 1424 that includes a turning mirror and a diffractive optical element (DOE). The light source 1425 may be a laser, a superluminescent diode, or a partially coherent LED, for example. In an embodiment, the DOE produces an array of spots arranged in a regular pattern. In an embodiment, the projector 2720 emits light at a near infrared wavelength.

In an embodiment, the first camera 2730 includes a first-camera body 2734 and a first-camera front surface 1436. In an embodiment, the first camera includes a lens, a photosensitive array, and camera electronics. The first camera 2730 forms on the photosensitive array a first image of the uncoded spots projected onto an object by the projector 2720. In an embodiment, the first camera responds to near infrared light.

In an embodiment, the second camera 2740 includes a second-camera body 2744 and a second-camera front surface 1446. In an embodiment, the second camera includes a lens, a photosensitive array, and camera electronics. The second camera 2740 forms a second image of the uncoded spots projected onto an object by the projector 2720. In an embodiment, the second camera responds to light in the near infrared spectrum. In an embodiment, a processor 2702 is used to determine 3D coordinates of points on an object according to methods described herein below. The processor 2702 may be included inside the body 2705 or may be external to the body. In further embodiments, more than one processor is used. In still further embodiments, the processor 2702 may be remotely located from the triangulation scanner.

It should be appreciated that the controller/processor 2702, the controller 2438, the controller 668, the processor 704 and the controller 116 may be coupled for communication. In an embodiment, the controllers may integrated into a single processing unit, or collectively operated as a single processing unit. In some embodiments, the functionality of one or more of the controllers may be integrated into another controller. For example, in an embodiment, the controller 116 may be eliminated and the operational methods performed by the controller 116 may be performed by the controller 668, the processor 704, the controller 2438, the controller 2702, or a combination of the foregoing.

Referring now to FIGS. 28-31, an embodiment is shown of a method 2800 for scanning an environment with the mobile scanning platform 100. The method 2800 starts in block 2802 by connecting the mobile device 641 to the 2D scanning device 108. The operator 2904 then activates the scanning device 108 and proceeds to walk along a path 2900 through the environment 2902 where the scans are desired. As the operator 2904 defines the path 2900 by walking through the environment 2902, the scanning device 108 generates a map of the environment 2902 as described herein with respect to FIGS. 6-21. In an embodiment, the 2D scanning device 108 tracks its position within the environment to define the path. As the operator 2904 defines the path 2900, the operator may selectively define locations 3000 in block 2806 where the mobile scanning platform 100 should stop and perform a 3D scan of the environment 2900 with the 3D scanner 110.

With the path 2900 defined, and the 3D scan locations 3000 defined, the operator 2904 proceeds back to the mobile scanning platform 100 and couples the 2D scanning device 108 to the base unit 102 in block 2808. In an embodiment, the map generated by the 2D scanning device 108, the defined path 2900 and the scanning locations 3000 are transferred from memory (e.g. memory 668 or memory 706) to the controller 116 in block 2810. The method 2800 then proceeds to block 2814 where the controller 116 activates the motors 500 and steers the mobile scanning platform 100 along the path 2900. In an embodiment, the 2D scanning device 108 is activated and localizes the mobile scanning platform 100 with the map previously generated in block 2804. With the mobile scanning platform localized, the relative position of the mobile scanning platform within the environment 2902 is known and the controller 116 may steer the mobile scanning platform 100 to the first 3D scanning location 3000. The 3D scan is performed by the 3D scanner 110 in block 2816, such as in the manner described herein with respect to FIGS. 24-26 or FIGS. 27A-27D for example.

The method 2800 then proceeds to query block 2818 where it is determined whether the additional 3D scan locations 3000 have been defined. When query block 2818 returns a positive, the method 2800 loops back to block 2814 where the controller 116 causes the mobile scanning platform 100 to move along the path 2900 (FIG. 31) to the next defined 3D scanning location 3000. In an embodiment, as the mobile scanning platform 100 moves along the path 2900, the 2D scanning device 108 is operated and the scan data is used to continuously, periodically or aperiodically localize the mobile scanning platform 100 within the environment 2902 using the map generated in block 2804. This allows the mobile scanning platform 100 to maintain a position on or near the defined path 2900. In an embodiment, if the mobile scanning platform 100 encounters an obstacle within the environment 2902, the controller 116 generates a new path from the present position to the next 3D scanning location 3000. The method 2800 continues to perform the steps of blocks 2814, 2816, 2818 until 3D scans have been performed at all of the defined 3D scanning locations.

At this point, the query block 2818 returns a negative and the method 2800 stops in block 2820. It should be appreciated that additional actions may be performed with the data acquired by the mobile scanning platform 100, such as but not limited to the registration of the 3D coordinate values acquired by the 3D scanner 110 at each of the locations 3000 to each other to define a single 3D coordinate data set of the environment 2902 (e.g. a point cloud). In an embodiment, the map generated in block 2804 and the scan locations 3000 from block 2806 are used in the registration of the 3D coordinate value data sets.

Technical effects and benefits of some embodiments include providing a system and a method that facilitate the defining of a pathway for a mobile system to travel and perform three-dimensional measurements of the environment in which the mobile system is traveling.

The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for measuring three-dimensional (3D) coordinate values of an environment, the system comprising:
    a mobile base unit;
    a scanner coupled to the base unit, the scanner including a light source, an image sensor and a controller, the controller being configured to determine a distance value to one or more object points in the environment based on emitting a beam of light with the light source and receiving the beam of light with the image sensor;
    a 3D scanner coupled to the base unit, the 3D scanner operable to selectively measure 3D coordinates of surfaces in the environment; and
    one or more processors operably coupled to the base unit, the scanner and the 3D scanner, the one or more processors being responsive to nontransitory executable instructions for performing a method comprising:
    moving the mobile base unit through the environment along a path;
    localizing the mobile base unit within the environment based at least in part on the scanner emitting and receiving the beam of light while the mobile base unit is moved along the path, the localizing being determined in advance as at least one or more locations for initiating measurement of 3D coordinate values;
    causing the 3D scanner to measure the 3D coordinate values of the environment; and
    storing the 3D coordinate values in memory.

2. The system of claim 1, wherein the scanner is a two-dimensional (2D) scanner that sweeps the beam of light in a substantially horizontal plane.

3. The system of claim 2, wherein the 3D scanner is a time-of-flight (TOF) coordinate measurement device configured to measure the 3D coordinate values in a volume about the 3D scanner.

4. The system of claim 2, wherein the 3D scanner is a triangulation scanner.

5. The system of claim 4, wherein the one or more processors is further responsive for generating a map of the environment using the scanner.

6. The system of claim 1, wherein the method further includes registering the 3D coordinate values.

7. The system of claim 6, wherein the registration is based on the scanner emitting and receiving the beam of light.

8. A method for measuring three-dimensional (3D) coordinate values of an environment, the method comprising:
    moving a scanning platform through the environment along a path, the scanning platform having a scanner and a 3D scanner, the scanner having a light source and an image sensor, the 3D scanner being operable to measure 3D coordinates of surfaces in the environment;
    localizing the scanning platform as the scanning platform is moved along the path, the localizing being based on the scanner emitting a beam of light and receiving with the image sensor a reflection of the beam of light, the localizing being determined in advance as at least one or more locations for initiating measurement of 3D coordinate values; and
    measuring the 3D coordinate values of the environment with the 3D scanner.

9. The method of claim 8, wherein the emitting the beam of light from the scanner includes sweeping emitted beams of light in a plane that is substantially horizontal.

10. The method of claim 9, further comprising registering the 3D coordinate values.

11. The method of claim 10, wherein the registration is based at least in part on the scanner emitting the beam of light and receiving at the image sensor the reflection of the beam of light.

12. The method of claim 11, wherein the registering of the 3D coordinate values includes defining a point cloud.

13. The method of claim 8, wherein the 3D scanner is a TOF scanner that is configured to measure 3D coordinate values in a volume about the 3D scanner.

14. The method of claim 8, wherein the 3D scanner is a triangulation scanner.

15. The method of claim 8, further comprising generating a map of the environment using the scanner.

* * * * *